US012693739B2

(12) United States Patent　　(10) Patent No.: US 12,693,739 B2
Tesdahl et al.　　　　　　　　　　(45) Date of Patent:　　Jul. 28, 2026

(54) EYE AND HAND TRACKING UTILIZING LENSLESS CAMERA AND MACHINE LEARNING

(71) Applicant: Microsoft Technology Licensing, LLC, Redmond, WA (US)

(72) Inventors: Curtis Alan Tesdahl, Fort Collins, CO (US); Benjamin Eliot Lundell, Seattle, WA (US); David Rohn, Fort Collins, CO (US); Dmitry Reshidko, Sammamish, WA (US); Dmitriy Churin, Redmond, WA (US); Kevin James Matherson, Fort Collins, CO (US); Sayyed Jaffar Ali Raza, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/068,703

(22) Filed: Mar. 3, 2025

(65) Prior Publication Data

US 2025/0199614 A1　　Jun. 19, 2025

Related U.S. Application Data

(62) Division of application No. 18/480,181, filed on Oct. 3, 2023, now Pat. No. 12,242,667, which is a division
(Continued)

(51) Int. Cl.
*G06F 3/01*　　　(2006.01)
*G02B 27/00*　　(2006.01)
(Continued)

(52) U.S. Cl.
CPC ......... *G06F 3/013* (2013.01); *G02B 27/0093* (2013.01); *G02B 27/0101* (2013.01);
(Continued)

(58) Field of Classification Search
CPC ....... G06F 3/013; G06F 3/01; G02B 27/0093; G02B 27/00; G02B 27/0101; G02B 27/01;
(Continued)

(56) References Cited

U.S. PATENT DOCUMENTS

| 2006/0157640 | A1* | 7/2006 | Perlman | ................. | H04N 25/00 |
| | | | | | 348/E5.079 |
| 2008/0128625 | A1* | 6/2008 | Lamadie | ................. | G01T 1/295 |
| | | | | | 250/361 R |

(Continued)

FOREIGN PATENT DOCUMENTS

EP　　　　2503379 A1 *　9/2012　............. G02B 27/46

*Primary Examiner* — Stephen G Sherman
(74) *Attorney, Agent, or Firm* — Michael T. Abramson; Jordan IP Law, LLC

(57)　　　　　　ABSTRACT

Eye and hand tracking systems in head-mounted display (HMD) devices are arranged with lensless camera systems using optical masks as encoding elements that apply convolutions to optical images of body parts (e.g., eyes or hands) of HMD device users. The convolved body images are scrambled or coded representations that are captured by a sensor in the system, but are not human-recognizable. A machine learning system such as a neural network is configured to extract body features directly from the coded representation without performance of deconvolutions conventionally utilized to reconstruct the original body images in human-recognizable form. The extracted body features are utilized by the respective eye or hand tracking systems to output relevant tracking data for the user's eyes or hands which may be utilized by the HMD device to support various applications and user experiences. The lensless camera and machine learning system are jointly optimizable on an end-to-end basis.

20 Claims, 20 Drawing Sheets

Related U.S. Application Data of application No. 17/832,424, filed on Jun. 3, 2022, now Pat. No. 11,803,238.

(51) Int. Cl.

| | |
|---|---|
| *G02B 27/01* | (2006.01) |
| *G06N 3/084* | (2023.01) |
| *G06V 10/82* | (2022.01) |
| *G06V 40/10* | (2022.01) |
| *G06V 40/18* | (2022.01) |

(52) U.S. Cl.
CPC ........... *G02B 27/017* (2013.01); *G06N 3/084* (2013.01); *G06V 10/82* (2022.01); *G06V 40/11* (2022.01); *G06V 40/193* (2022.01); *G02B 2027/0138* (2013.01); *G02B 2027/014* (2013.01)

(58) Field of Classification Search
CPC .............. G02B 27/017; G02B 27/4272; G02B 27/0081; G02B 27/0172; G02B 27/0178; G02B 2027/0138; G02B 2027/014; G02B 5/1819; G02B 5/18; G06N 3/084; G06V 10/82; G06V 40/11; G06V 40/10; G06V 40/193; G06V 40/18
See application file for complete search history.

(56) References Cited

U.S. PATENT DOCUMENTS

| | | | | |
|---|---|---|---|---|
| 2009/0008565 A1* | 1/2009 | Gottesman | .............. | G01T 1/295 |
| | | | | 250/370.06 |
| 2009/0020714 A1* | 1/2009 | Slinger | .................. | H04N 25/00 |
| | | | | 250/550 |
| 2018/0089834 A1* | 3/2018 | Spizhevoy | ................ | G06T 7/12 |
| 2018/0300589 A1* | 10/2018 | Levinshtein | ............ | G06F 3/012 |
| 2018/0341858 A1* | 11/2018 | Otterstedt | ................ | G06N 3/08 |
| 2019/0246036 A1* | 8/2019 | Wu | ........................ | G06F 3/0484 |
| 2021/0232216 A1* | 7/2021 | Hudman | ................. | G06F 3/013 |
| 2023/0316804 A1* | 10/2023 | Li | ...................... | G06V 10/7715 |

* cited by examiner

800

Optical mask 710

Diffractive optical element (DOE) 805

Coded aperture 815

Amplitude mask 820

Phase mask 825

Diffuser 830

Holographic diffraction grating film 835

Metasurface 840

Other DOE 845

Refractive optical element (ROE) 810

Photorefractive holographic gratings 850

Microlenslet array (MLA) 855

Shack-Hartmann MLA 860

Other ROE 865

1300

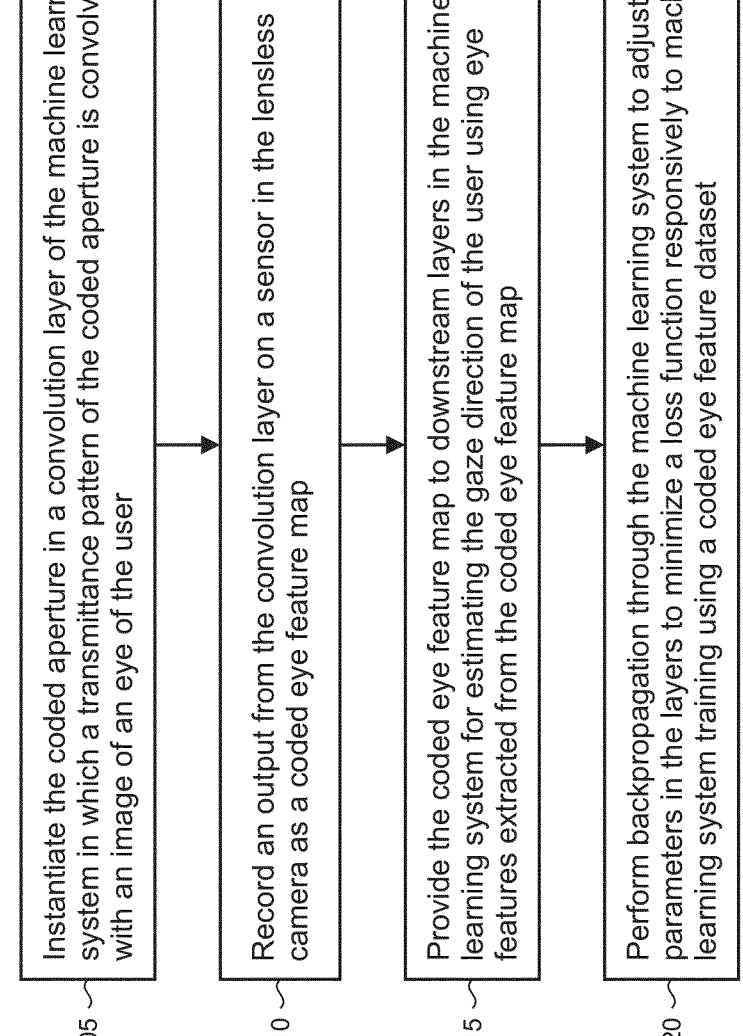

1405 — Instantiate the coded aperture in a convolution layer of the machine learning system in which a transmittance pattern of the coded aperture is convolved with an image of an eye of the user 1410 — Record an output from the convolution layer on a sensor in the lensless camera as a coded eye feature map 1415 — Provide the coded eye feature map to downstream layers in the machine learning system for estimating the gaze direction of the user using eye features extracted from the coded eye feature map 1420 — Perform backpropagation through the machine learning system to adjust parameters in the layers to minimize a loss function responsively to machine learning system training using a coded eye feature dataset

1510

1505

1605

1505

1500

1510

1705

1510

610$_L$

610$_R$

105

1900

1

EYE AND HAND TRACKING UTILIZING LENSLESS CAMERA AND MACHINE LEARNING

CROSS REFERENCE TO RELATED APPLICATIONS

This application is a divisional application of and claims priority to U.S. patent application Ser. No. 18/480,181, filed Oct. 3, 2023, entitled "EYE AND HAND TRACKING UTILIZING LENSLESS CAMERA AND MACHINE LEARNING" which is a divisional application of and claims priority to U.S. patent application Ser. No. 17/832,424, filed Jun. 3, 2022, entitled "EYE AND HAND TRACKING UTILIZING LENSLESS CAMERA AND MACHINE LEARNING", the entirety of which are hereby incorporated herein by reference for all purposes.

BACKGROUND

In a wearable device such as a head-mounted display (HMD) device, tracking the positions of the eyes of a user can enable estimation of the direction of the user's gaze. Gaze direction can be used as an input to various programs and applications that control the display of images of virtual objects on the HMD devices, among other functions. Applications can track positions of the user's hands to enable interactions with virtual objects by direct touch and/or indirect gestures as if they were real objects. To determine the position and gaze of the user's eyes, an eye tracker may be incorporated into the HMD device. A hand tracker may be incorporated into the HMD device to determine a user's actions and gestures using their hands.

SUMMARY

Eye and hand tracking systems in HMD devices are arranged with lensless camera systems using optical masks as encoding elements that apply convolutions to optical images of body parts (e.g., eyes or hands) of HMD device users. The convolved body images are scrambled or coded representations that are captured by a sensor in the system, but are not human-recognizable (i.e., the coded representations comprise non-image data that remain in a convolved state). A machine learning system such as a neural network is configured to extract body features directly from the coded representation without performance of the deconvolutions that would be conventionally utilized to reconstruct the original body images in human-recognizable form. The extracted body features are utilized by the respective eye or hand tracking systems to output relevant tracking data for the user's eyes or hands which may be utilized by the HMD device to support various applications and user experiences.

In various illustrative examples, the optical mask is described by a point spread function (PSF) and may be implemented using diffractive optical elements such as coded apertures, amplitude masks, phase masks, diffusers, holographic diffraction grating films, or metasurfaces. Refractive optical elements such as microlens arrays (MLAs), lenses, or combinations of diffractive and refractive optical elements may also be utilized for the optical mask. An exemplary eye tracking system in an HMD device supports an inward-facing lensless camera system that includes an illumination system for flooding diffuse illumination to the HMD device user's eye to produce reflective glints, an optical mask that applies a PSF to convolve the reflected light, and a sensor that captures the output from the optical mask as coded eye feature maps.

A neural network, such as a convolutional neural network (CNN), trained with sets of coded eye features, extracts eye features for the HMD device user directly from the coded eye feature maps to estimate a gaze direction without reconstructing the original eye images through deconvolution. For example, the eye features may include pupil ellipse coordinates, pupil center, illumination glint locations, and the like.

An optional feature of the eye tracking system is configuration of the PSF of the optical mask to encode depth cues from reflected eye features on a single image basis. The coded eye feature map captured by the sensor includes depth cues from which the neural network extracts depth estimates for the eye features. The depth estimates may be utilized to enhance eye tracking speed and accuracy while reducing consumption of scarce HMD device resources (e.g., processor cycles, memory, power, etc.) and/or enable applications to implement features based on knowledge of eye feature depth.

An exemplary hand tracking system in the HMD device supports an outward-facing lensless camera system that includes an optical mask to apply a PSF to light from an illumination source that is reflected from the user's hands and a sensor that captures the output from the optical mask as coded hand feature maps. A neural network trained with sets of coded hand features is configured to extract hand features (e.g., palm center, fingertip position, hand orientation, etc.) directly from the coded representations to estimate hand location and/or pose without reconstructing the original hand images through deconvolution.

An illustrative CNN is architected using optical and electrical domains so that the lensless camera and machine learning systems may be jointly optimized on an end-to-end basis. An optical mask is provided as a first convolutional layer of the CNN in the optical domain. In this convolutional layer, the weight distribution of a filter (e.g., a collection of PSF kernels) corresponds to the transmittance pattern of the optical mask. The optical output from the mask captured by the sensor is provided as an input to the remaining layers of the neural network in the electrical domain that perform body feature extraction processing. The optical mask and body feature extraction neural network may be jointly designed and optimized using backpropagation feedback to minimize the loss function from which gradients for weights in the neural network model, including the optical mask, are calculated for machine learning.

Advantageously, the lensless camera and machine learning systems provide accurate body tracking in lightweight and compact form factors which are particularly beneficial in HMD device applications where weight and bulk are sought to be minimized. Body feature extraction directly from the coded representations, while constraining performance of deconvolution, is less computationally intensive than conventional methodologies. Less computation improves body tracking performance by reducing latency, and power consumption is lowered which improves battery life in an HMD device. The end-to-end optimization of the combined lensless camera and machine learning systems can speed convergence to optimal machine learning parameters and reduce training costs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 14 is a flowchart of an illustrative method for jointly optimizing a coded aperture in a lensless camera and a machine learning system;

Like reference numerals indicate like elements in the drawings. Elements are not drawn to scale unless otherwise indicated.

DETAILED DESCRIPTION

Figure 1:
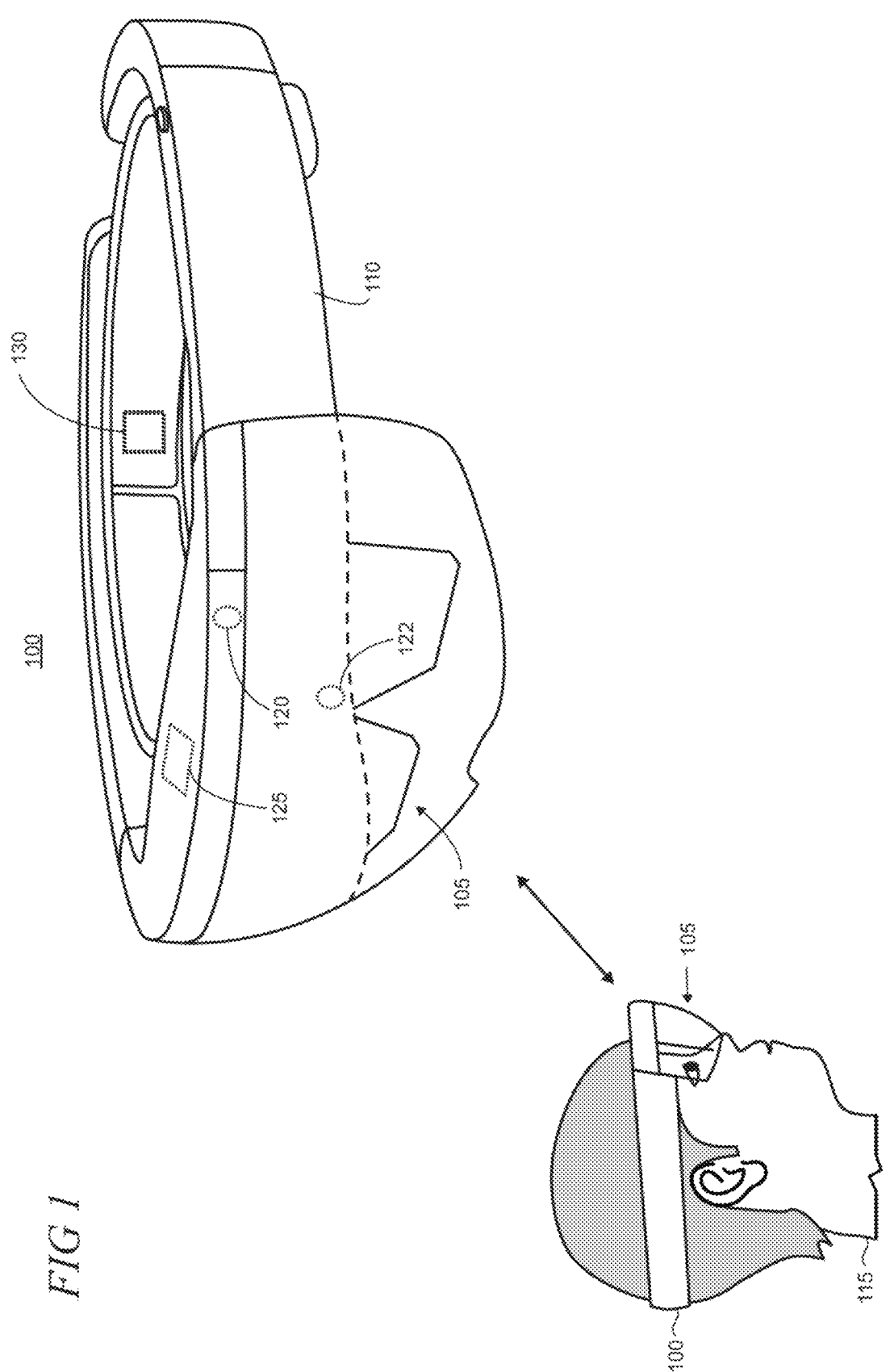
FIG. 1 shows a pictorial partially cutaway view of an illustrative HMD device configured with eye and/or hand tracking systems arranged in accordance with the present principles.

FIG. 1 shows a pictorial partially cutaway view of an illustrative HMD device 100 that is configured with eye and/or hand tracking systems arranged in accordance with the present principles. In this example, the HMD device includes a display device 105 and a frame 110 that wraps around the head of a user 115 to position the display device near the user's eyes to provide a virtual-reality or mixed-reality experience to the user. Any suitable technology and configuration may be used to display images using the display device. For example, for a virtual-reality experience, the display device may be an opaque display device. For a mixed-reality experience, the display device may be see-through so that the user of the HMD device 100 can view physical, real-world objects in the physical environment over which pixels for virtual objects are overlayed.

One or more outward-facing camera systems 120 and/or sensors (not shown) may be provided in the HMD device 100 to capture images of the surrounding physical environment. The captured images may be rendered on the display device 105 along with computer-generated virtual images that augment the captured images of the physical environment. The outward-facing camera systems may also be utilized to enable environment awareness and support of object or hand tracking, for example, as described below. One or more inward-facing camera systems 122 and/or sensors (not shown) may be provided in the HMD device 100 to capture eye images for eye tracking as described below.

The frame 110 may further support additional components of the HMD device 100, including a processor 125 and an inertial measurement unit (IMU) 130. The processor may include logic and associated computer memory configured to receive sensory signals from the IMU and other sensors, to provide display signals to the display device 105, to derive information from collected data, and to enact various control processes and systems as described herein.

The display device 105 may be arranged in some implementations as a near-eye display. In a near-eye display the display engine does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display device are visible.

Figure 2:
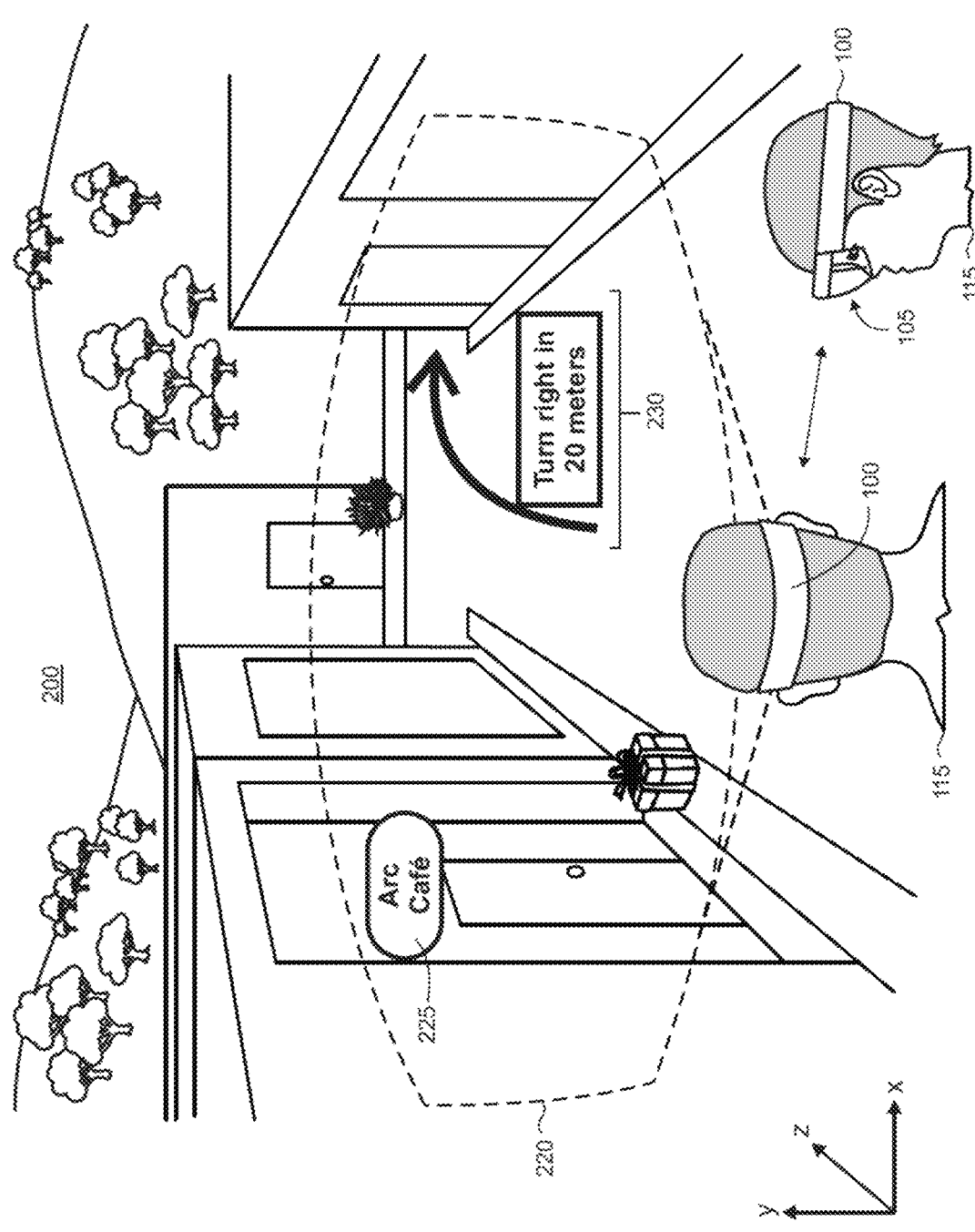
FIG. 2 illustratively shows virtual images that are overlayed onto real-world images within a field of view (FOV) of a mixed-reality head-mounted display (HMD) device.

FIG. 2 shows the HMD device 100 worn by a user 115 as configured for mixed-reality experiences in which the display device 105 is configured as a near-eye display system having at least a partially transparent, see-through waveguide, among various other components. As noted above, an imager (not shown) generates virtual images that are guided by the waveguide in the display device to the user. Being see-through, the waveguide in the display device enables the user to perceive light from the real world.

The see-through waveguide-based display device 105 can render images of various virtual objects that are superimposed over the real-world images that are collectively viewed using the see-through waveguide display to thereby create a mixed-reality environment 200 within the HMD device's FOV (field of view) 220. It is noted that the FOV of the real world and the FOV of the images in the virtual world are not necessarily identical, as the virtual FOV provided by the display device is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters may include eye-box size, brightness, transparency and duty time, contrast, resolution, color fidelity, depth perception, size, weight, form-factor, and user comfort (i.e., wearable, visual, and social), among others.

In an illustrative use case shown in FIG. 2, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the virtual images include a tag 225 that identifies a restaurant business and directions 230 to a place of interest in the city. The mixed-reality environment 200 seen visually on the waveguide-based display device may also be supplemented by audio and/or tactile/haptic sensations produced by the HMD device in some implementations.

Figure 3:
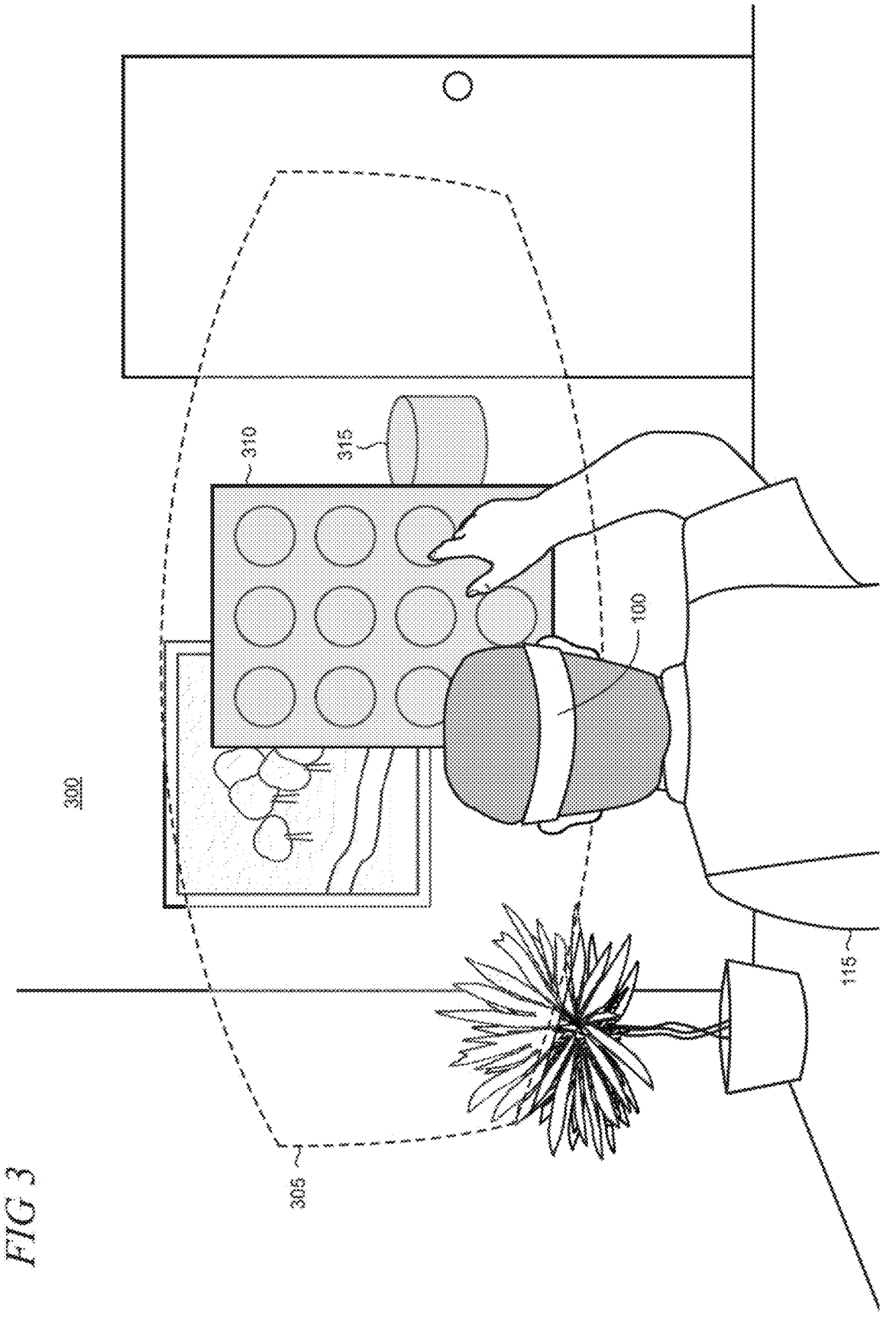
FIGS. 3 and 4 show an illustrative use case of hand tracking as provided by a hand tracking system arranged in accordance with the present principles.
Figure 4:
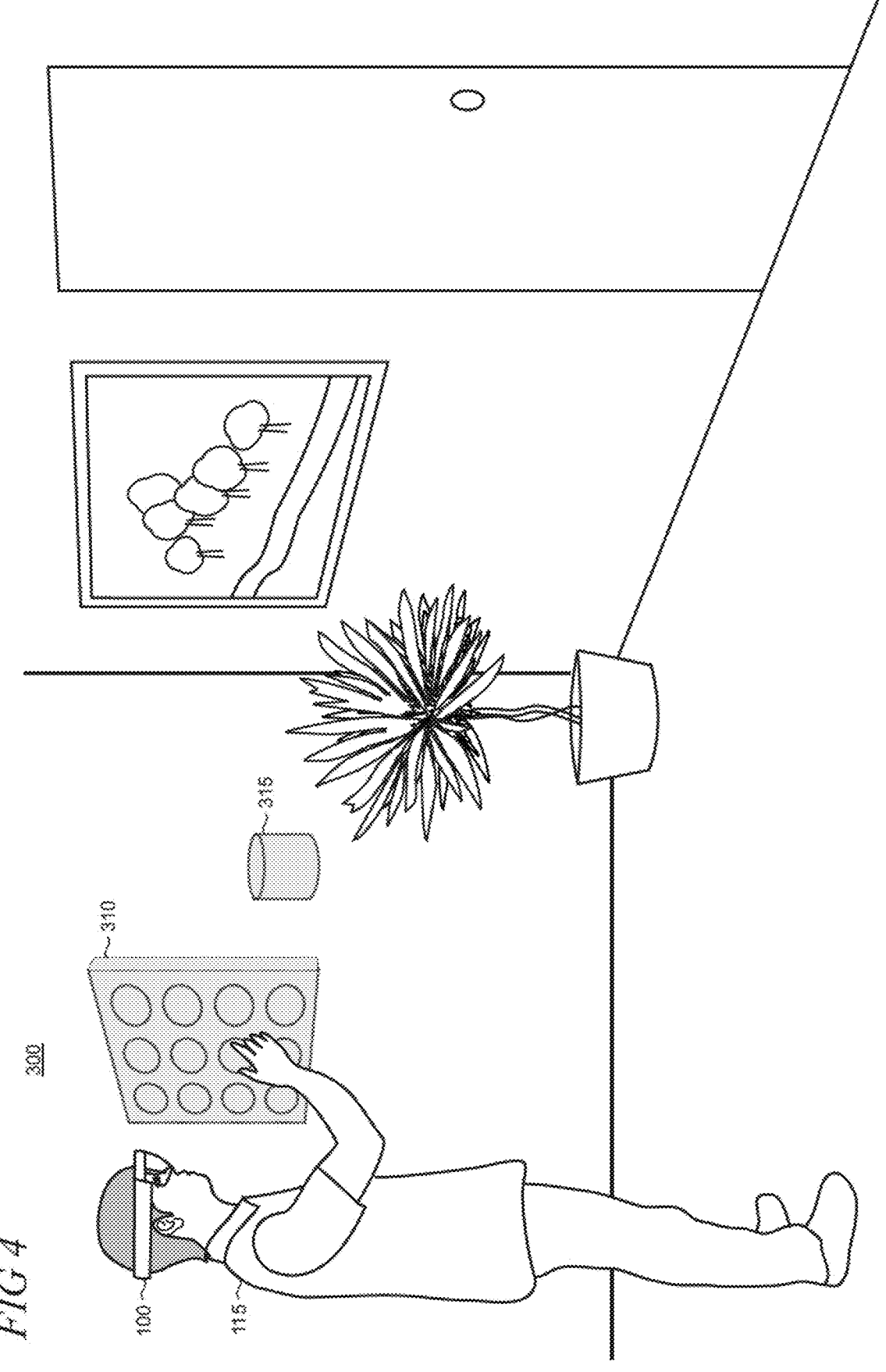

FIGS. 3 and 4 show an illustrative use case of hand tracking as supported by a hand tracking system arranged in accordance with the present principles. An exemplary hand tracking system is described below beginning at the text accompanying FIG. 6. FIG. 3 shows an exemplary mixed-reality environment 300 that includes both virtual and real objects. As shown, the user 115 of an HMD device 100 configured with a hand tracking system is enabled to interact with virtual objects 310 and 315 displayed in the FOV 305 of the device using their hands. FIG. 4 shows a different perspective of the mixed-reality environment 300 that may be supported, for example, on a display system of an HMD device used by another user (not shown).

Various types of interaction models may be supported by various applications using the present hand tracking system including, for example, virtual image manipulation through direct touch, pointing and gesturing using hands, and extended virtual environment interactions using handheld or worn control devices. For example, as shown in FIGS. 3 and 4, the user 115 is performing a button push on the virtual object 310. Other manipulations may include, for example, picking up, moving, scaling, and rotating virtual objects, targeting, selecting, and manipulating virtual objects that are out of direct reach, and virtual touchscreen interactions. In some use cases, the behavior of the virtual objects through user touch may mimic behaviors of objects in the real world. In other cases, the behaviors do not need to follow real-world rules or models.

Figure 5:
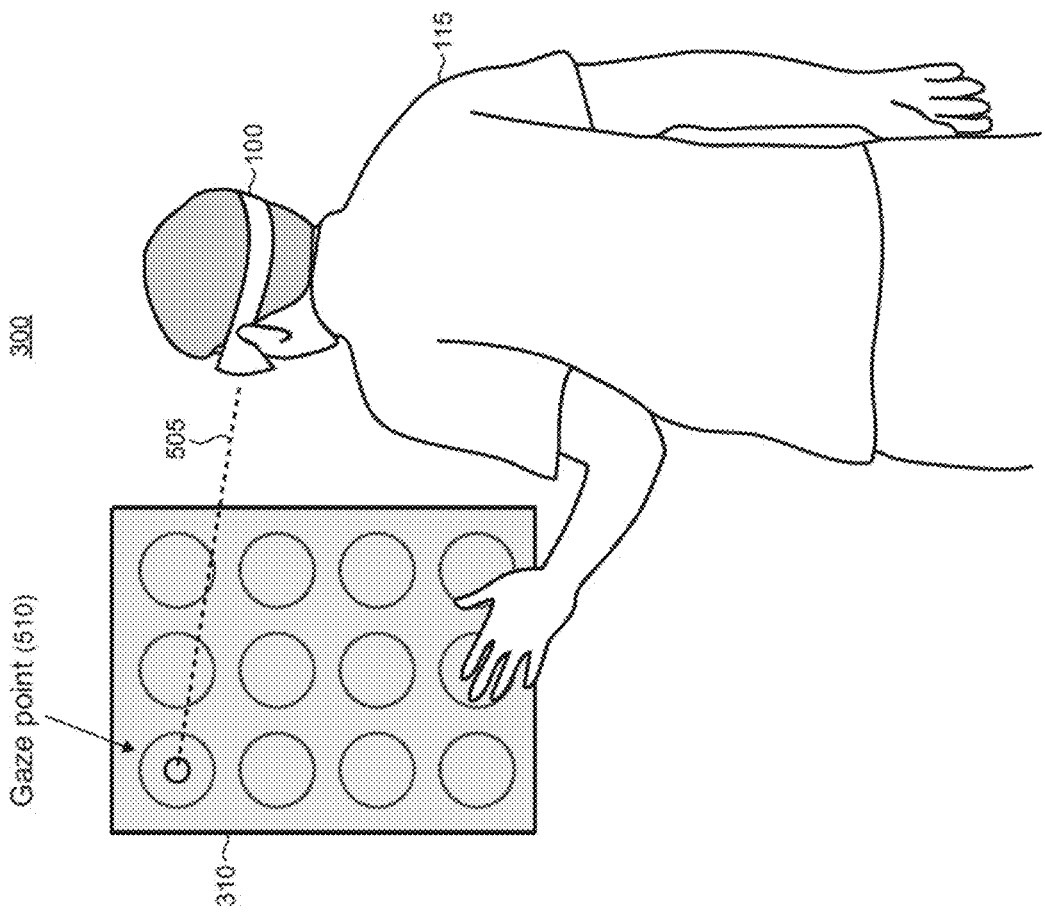
FIG. 5 shows an illustrative use case of eye tracking as provided by an eye tracking system arranged in accordance with the present principles.

FIG. 5 shows an illustrative use case of eye tracking in the mixed-reality environment 300 as supported by an eye tracking system arranged in accordance with the present principles. Eye tracking enables applications to track where the user is looking in real time. An exemplary eye tracking system is described below beginning at the text accompanying FIG. 6. The eye tracker in the HMD device 100 can expose a gaze ray 505, comprising a gaze origin and direction, from a single eye of the user 115 or from both eyes in some cases. An intersection between the gaze ray and an object in the environment (which may include real and/or virtual objects) may be utilized to estimate a gaze point 510.

Information about where and what a user looks at can provide a powerful context for other inputs, such as voice, hands, and controllers. Such knowledge of user intent can be used for various tasks. For example, eye tracking tasks may include quickly and effortlessly targeting across the scene by looking at a virtual object and saying "select" or "put this . . . ", then looking over to where the user wants to place the virtual object and say " . . . there". Other exemplary interactions between the HMD device user 115 and the mixed-reality environment 300 can include, for example, eye-gaze-based auto scroll where the user can read a long text, which automatically starts scrolling once the user gets to the bottom of the textbox and eye-supported zoom and pan in which triggering and controlling zoom speed can be controlled by voice or hand input, which is important for providing the user with the feeling of control.

It may be appreciated that the present eye and hand tracking systems may be utilized in complementary ways. For example, a hand tracking use case using direct virtual object manipulation by hand might be frustrating for the user 115 if they cannot move their hands within the mixed-reality environment 300 without unintentionally interacting with a virtual object. Use of the eye tracking system may reduce unintentionally triggering a touch-based manipulation response. Eye tracking can allow for a better understanding of which virtual object a user is currently engaged. In addition to addressing false positive activations, another example of hand tracking enhancement through eye tracking includes better identifying which particular virtual objects to grab or poke as the precise interaction point may not otherwise be clear, especially if several virtual objects are positioned close to each other in the mixed-reality environment.

Figure 6:
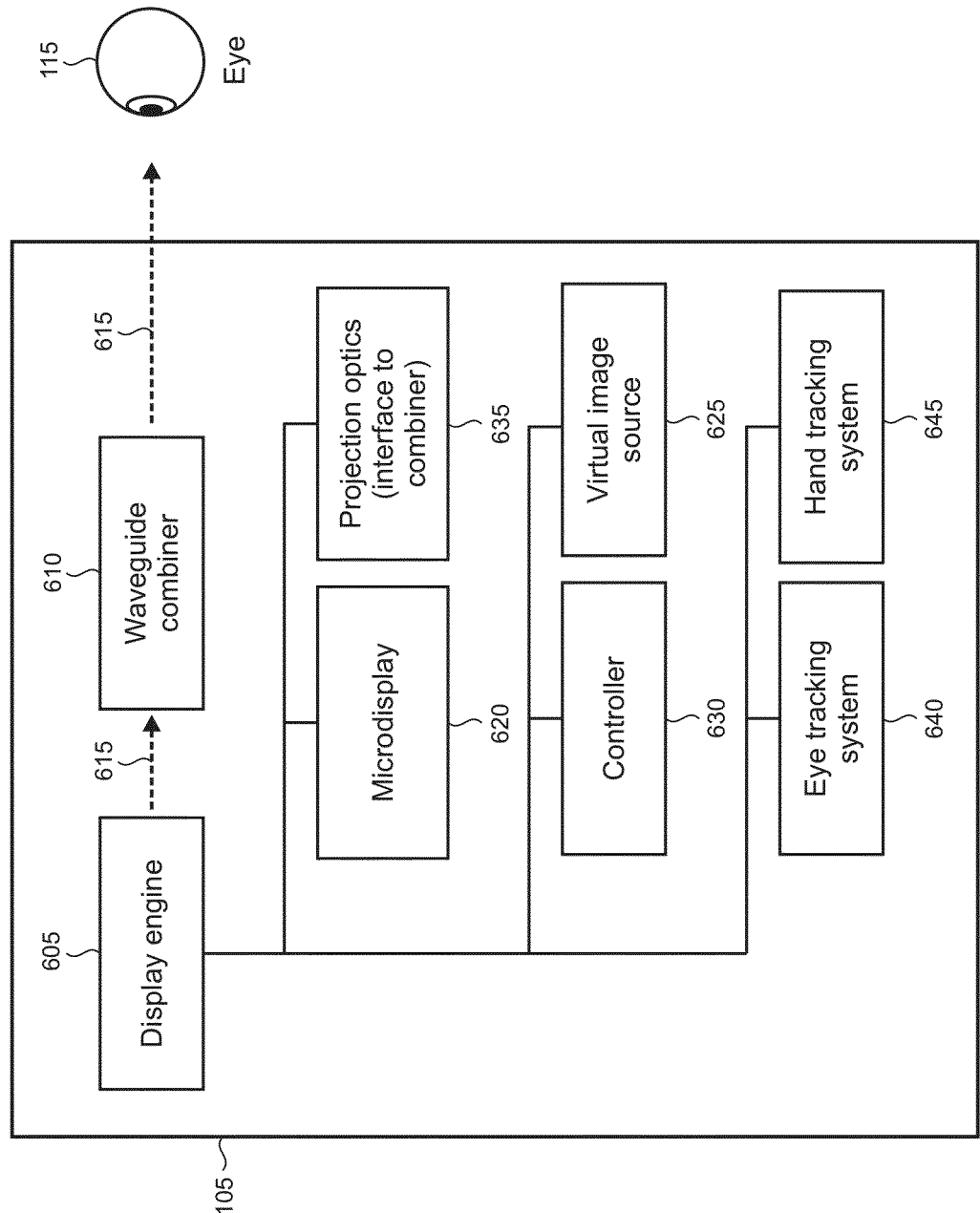
FIG. 6 shows illustrative components of a mixed-reality HMD device configured with eye and/or hand tracking systems arranged in accordance with the present principles.

FIG. 6 shows illustrative components of the display device 105 that may be utilized in the HMD device 100 (FIG. 1) in the illustrative mixed-reality environment 300 shown in FIGS. 3-5. The display device includes a display engine 605 and a waveguide combiner 610 to provide images of virtual and real-world objects to the user 115 over a light path 615. As shown, the display engine 605 may include a microdisplay 620 that is arranged to provide a display of virtual images from a source 625 or image processor to the waveguide combiner responsively to instructions from a controller 630. The microdisplay may comprise, for example, RGB (red, green, blue) LEDs, an organic LED (OLED) array, liquid crystal on silicon (LCoS) device, and/or microelectromechanical systems (MEMS) device, or any other suitable displays or microdisplays operating in transmission, reflection, or emission.

Projection optics 635 may be utilized to shape the virtual images, as needed, to support an optical interface between the display engine and the waveguide combiner 610. The projection optics and waveguide combiner may be referred to collectively as a projection system, as such components are arranged to project the virtual images from the display engine 605 for viewing by an HMD device user 115. For example, an HMD device may be configured with a near-eye display system in which virtual images are projected onto the retinas of the user.

In an illustrative implementation, a waveguide in the waveguide combiner 610 operates using a principle of total internal reflection (TIR) so that light can be coupled among the various optical elements in the HMD device 100 (FIG. 1). TIR is a phenomenon which occurs when a propagating light wave strikes a medium boundary (e.g., as provided by the optical substrate of a waveguide or prism) at an angle larger than the critical angle with respect to the normal to the surface.

The display system 105 may further include an eye tracking system 640 and hand tracking system 645. In alternative implementations, these systems may be incorporated into other parts or components of the HMD device 100 (FIG. 1) instead of the display system 105. Each of the eye tracking and hand tracking systems may be configured with a lensless camera and machine learning system arranged in accordance with the present principles.

Figure 7:
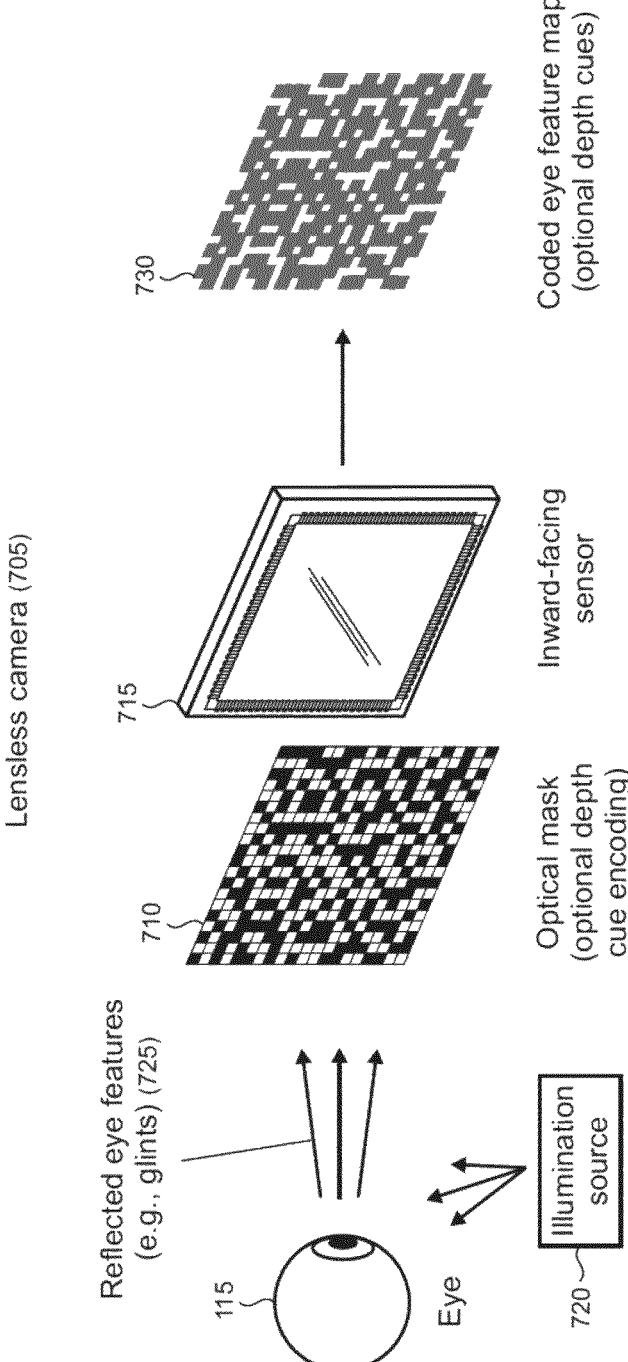
FIG. 7 shows illustrative components of a lensless camera that may be utilized in an eye tracking system arranged in accordance with the present principles.

FIG. 7 shows an exploded view of illustrative components of a lensless camera 705 that may be utilized in the eye tracking system 640. The lensless camera includes an optical mask 710 that is configured to interoperate with an adjacent inward-facing sensor 715 such as a CMOS (complementary metal oxide semiconductor) image sensor, CCD (charge-coupled device) image sensor, or other suitable passive- or active-pixel image sensor. An illumination source 720 is configured to provide non-visible illumination to the eye 115, for example, using infrared (IR) or near-IR wavelengths. Reflected light 725 corresponding to eye features (e.g., glints) impinge on the optical mask which controls transmittance of light in a spatially-coded pattern based on the mask configuration. For example, the eye features may include pupil ellipse coordinates, pupil center, illumination glint locations, and the like.

The optical mask 710 controls transmittance such that each angle of light in the FOV of the display system 105 (FIG. 1) will shadow the same pattern onto the inward-facing sensor 715 but in a linearly shifted manner related to the angle of light in both vertical and horizontal directions. The coded data captured at the sensor thus comprises the summation of these shadows from each angle within the FOV. It is noted that the patterns shown in all of the drawings for the optical masks and corresponding coded feature maps are arbitrary and the representations are simplified for the sake of clarity in exposition.

The reflected eye features 725 are captured by the inward-facing sensor 715 as a coded eye feature map 730. Changes in reflected eye features, such as glints from the user's eyeballs and/or a location of a user's pupil, as determined from coded eye features gathered using the inward-facing sensor, may be used to estimate a direction of gaze with some degree of probability.

An optionally-implementable feature includes configuring the optical mask 710 in the lensless camera 705 to perform depth cue encoding from the reflected eye features 725. The depth cue encoding of the optical mask results in the coded eye feature map including coded depth cues from which depth estimation of eye features is performed by a machine learning system.

The depth cue encoding of the optical mask and depth estimation performed by the machine learning system provide additional eye tracking data which may enhance accuracy and robustness of the tracking systems in some applications and/or provide bases for additional application features that are supported by eye depth data, for example, HMD device calibration and individualization to a specific user. As the depth estimation is performed on single (i.e., monocular) eye feature images, eye tracking with depth estimation in the present arrangement can be implemented more simply with faster and more accurate depth estimation compared to conventional methodologies such as stereo image pair imaging and analysis. Single image depth estimation can therefore reduce the utilization of resources (processor cycles, memory, power, etc.) in the HMD device 100 (FIG. 1) which are typically scarce.

The optical mask 710 does not focus the reflected eye features 725 onto the inward-facing sensor as would a traditional lens. By being lensless, the combination of mask, illumination source, and sensor shown in FIG. 7 can be packaged in a form factor that is compact and lightweight compared to conventional cameras. In addition, the illumination source 720 can be implemented in a floodlight configuration that provides general diffuse illumination for an entire eye of the user. Such configuration may replace or minimize the structured illumination sources that are used in conventional eye tracking systems. For example, such conventional systems may typically utilize a set of IR light emitting diodes (LEDs) around the entire periphery of the user's eye to ensure accurate and robust corneal reflection tracking over the FOV of the display for a range of inter-pupillary distances to accommodate different HMD device users. The structured illumination from the set of LEDs may add extraneous bulk, weight, and design complications to HMD devices and increase consumption of scarce resources compared to the present eye tracking system.

Figure 8:
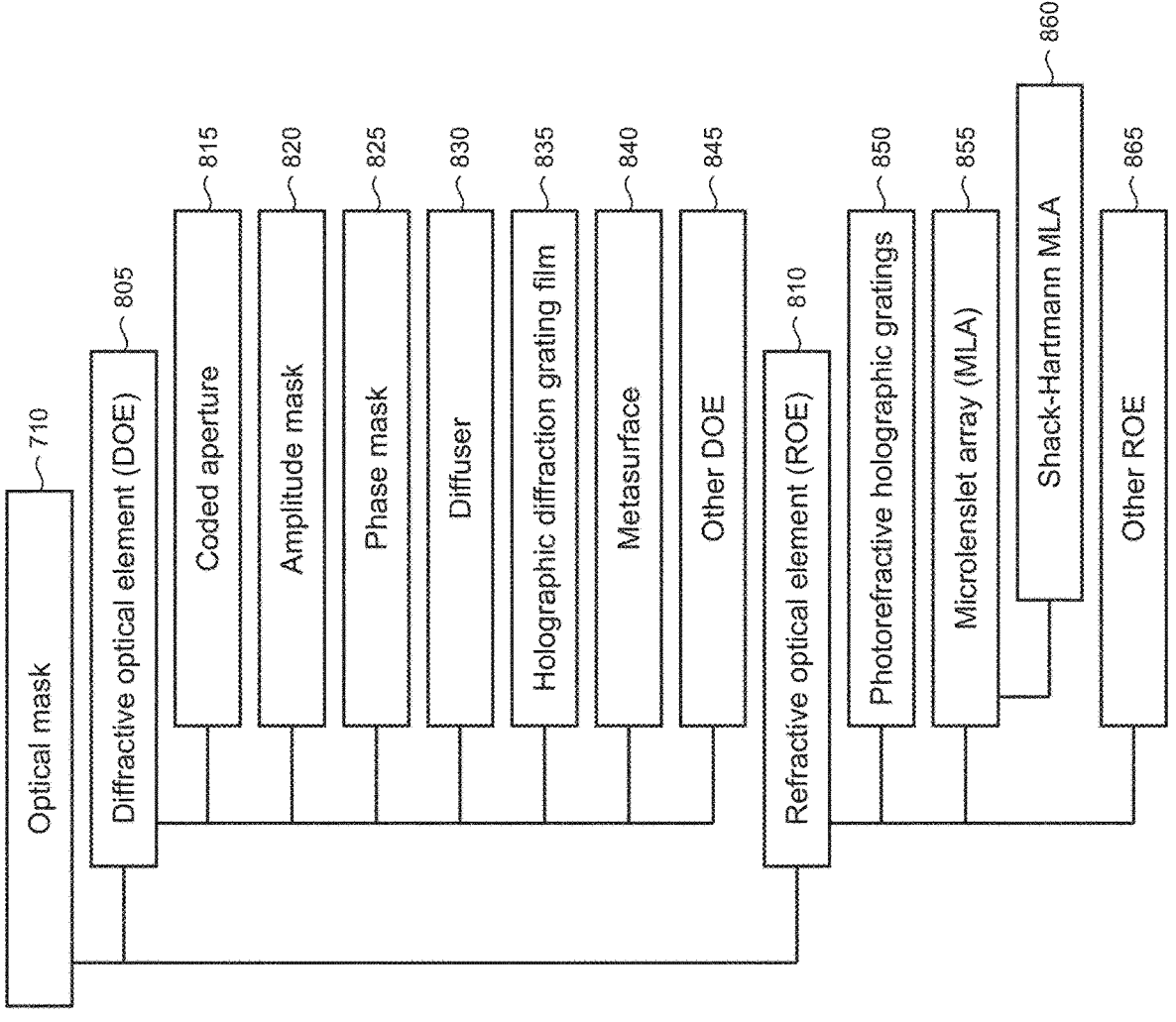
FIG. 8 shows an illustrative taxonomy for an optical mask arranged in accordance with the present principles.

FIG. 8 shows an illustrative taxonomy 800 for various illustrative technologies for the optical mask 710. The configuration for the optical mask and the technology utilized to realize it can vary by application (i.e., whether used for eye or hand tracking) and the particular requirements and usage environment of a given implementation of the present principles. Generally, the optical mask can include diffractive optical elements (DOEs) 805 and refractive optical elements (ROEs) 810.

The DOEs 805 may include, by way of example without limitation: coded aperture 815; amplitude mask 820; phase mask 825; diffuser 830; holographic diffraction grating film 835; metasurface 840; or other suitable DOE 845 or combination of DOE technologies and/or structures. The ROEs 810 may include, by way of example without limitation: photorefractive holographic gratings 850; microlenslet array (MLA) 855 such as a Shack-Hartmann MLA 860, or other suitable ROE 865 or combination of ROE technologies and/or structures. It may be appreciated that a given optical mask can also be implemented using a combination of DOE and ROE technologies and/or structures as appropriate.

Figure 9:
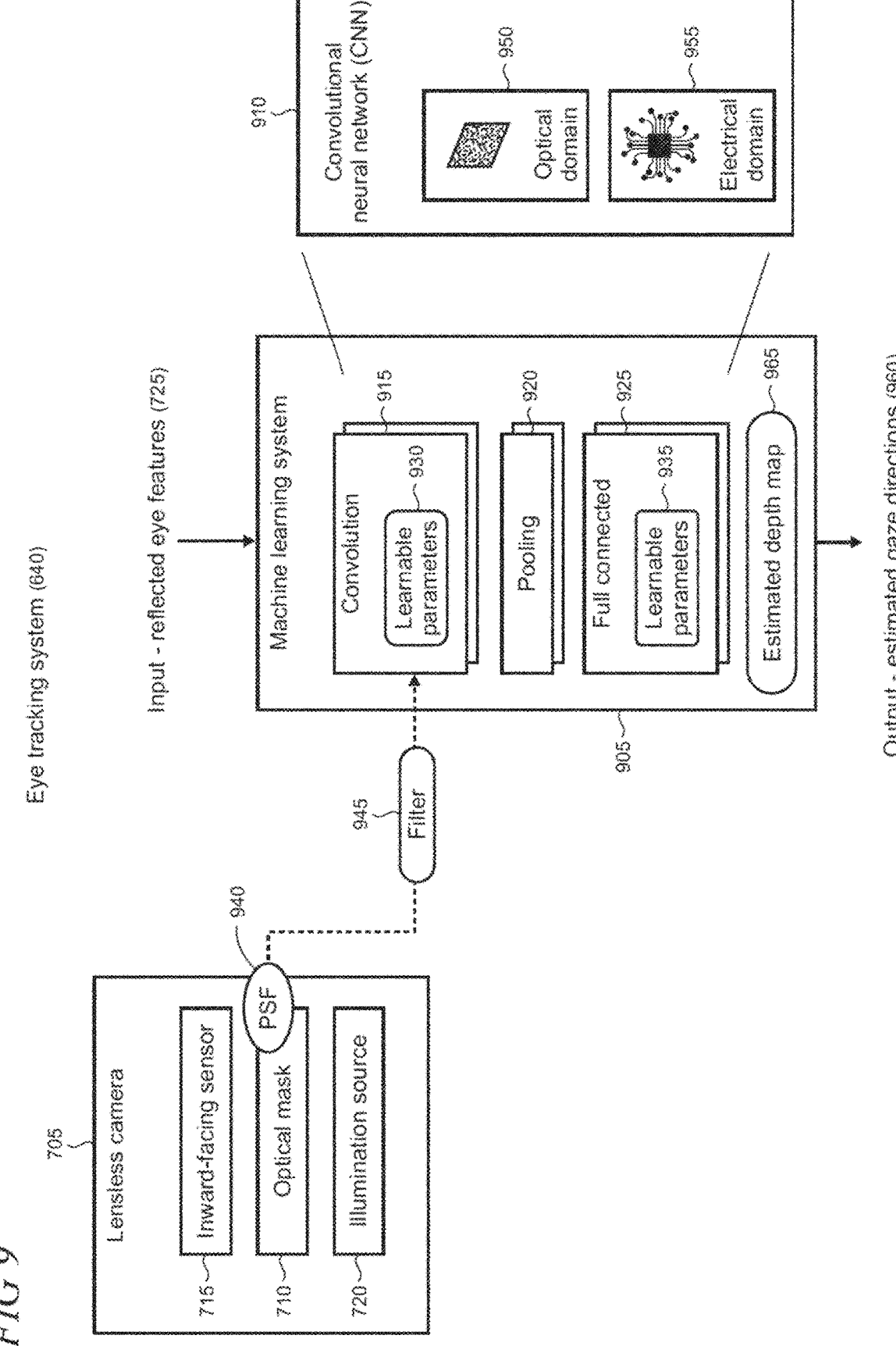
FIG. 9 shows an illustrative eye tracking system arranged in accordance with the present principles.

FIG. 9 shows the illustrative eye tracking system 640 arranged in accordance with the present principles comprising the lensless camera 705 and a machine learning system 905. In this illustrative example, the machine learning system comprises a convolutional neural network (CNN) 910 which may be described as a set of different layer types including a convolution layer 915, pooling layer 920, and fully connected layer 925. Multiple instances of layers of each type may be utilized in the CNN, as shown in the illustrative example in FIG. 12 and described in the accompanying text.

The convolution layer 915 and fully connected layer 925 include respective learnable parameters 930 and 935 that comprise weight matrices in the layers. It may be appreciated that an objective in a CNN is to learn the values of a parameter using backpropagation during training. The weight matrices contribute to the CNN model's predictive power and the learnable parameters are changed during backpropagation.

In accordance with the present principles, the point spread function (PSF) 940 of the optical mask 710 is used as a filter 945 (which may comprise a collection of PSF kernels) in a first convolution layer 915 of the CNN 910 in the machine learning system 905. Thus, the CNN includes both optical and electrical domains 950 and 955. The filter 945 is convolved with the input representing the reflected eye features 725 in the optical domain to generate the coded eye feature map which is passed as an input to the remaining layers of the CNN in the electrical domain. Mathematically, the learnable parameters of the first convolution layer correspond to the PSF of the optical mask. In optical terms, the parameters comprise the transmittance pattern of the optical mask.

The machine learning system 905 extracts eye features from the reflected eye features as encoded by the optical mask 710 into the coded eye feature map and uses the extracted features to provide an output 960 including estimated gaze directions. In implementations in which depth cues are encoded into the eye feature map, the machine learning system can generate an estimated depth map 965 from the depth cues. The estimated depth map may be utilized as additional data for eye tracking or it can be utilized for other purposes, as discussed above.

Figure 10:
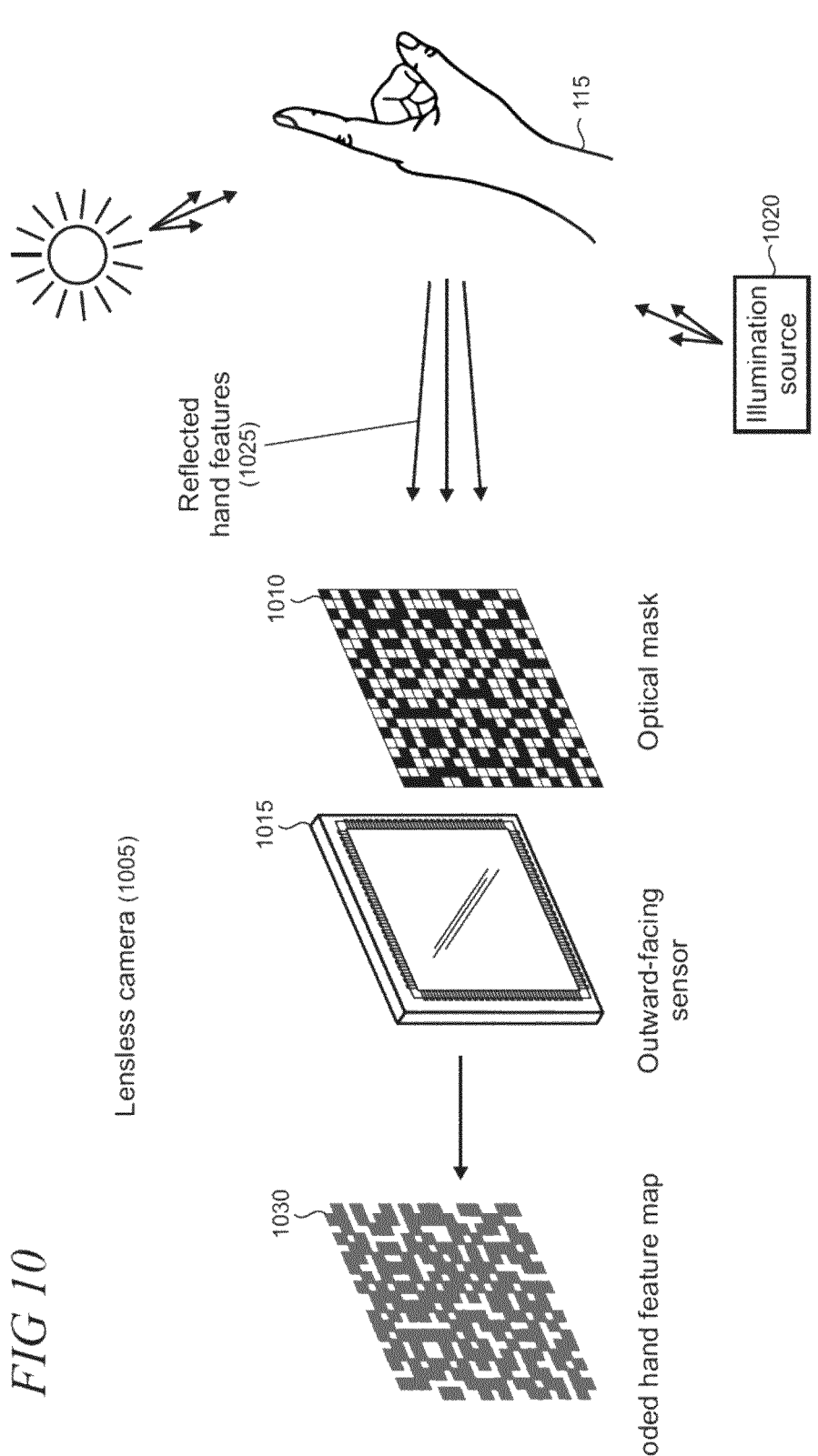
FIG. 10 shows illustrative components of a lensless camera that may be utilized in a hand tracking system arranged in accordance with the present principles.

FIG. 10 shows an exploded view of illustrative components of a lensless camera 1005 that may be utilized in the hand tracking system 645. The lensless camera includes an optical mask 1010 that is configured to interoperate with an adjacent outward-facing sensor 1015 such as a CMOS image sensor, CCD image sensor, or other suitable passive- or active-pixel image sensor. An illumination source 1020 is configured to provide non-visible illumination to one or both hands of the user 115, for example, using IR or near-IR wavelengths. In alternative implementations, sources of ambient light 1012 in visible wavelengths may be utilized to replace or supplement the IR light from source 1020.

Reflected light 1025 corresponding to hand features impinge on the optical mask which controls transmittance of light in a spatially-coded pattern, based on the mask configuration. For example, the hand features may include palm center, fingertip position, hand orientation, and the like. The hand features may be utilized by the hand tracking system 645 to create suitable hand tracking profiles and models such as hand meshes, joint models, or hand visualizations to support various applications and user experiences in a given mixed-reality environment.

In a similar manner to the optical mask 710 (FIG. 7) used in the eye tracking system, the optical mask 1010 here is configured to control transmittance of the reflected hand features such that each angle of light in the FOV of the display system 105 (FIG. 1) will shadow the same pattern onto the outward-facing sensor 1015 but in a linearly shifted manner related to the angle of light in both vertical and horizontal directions. The coded hand feature data captured at the sensor thus comprises the summation of these shadows from each angle within the FOV. The reflected hand features 1025 are captured by the outward-facing sensor 1015 as a coded hand feature map 1030. Changes in reflected hand features are extracted and utilized for hand tracking.

Figure 11:
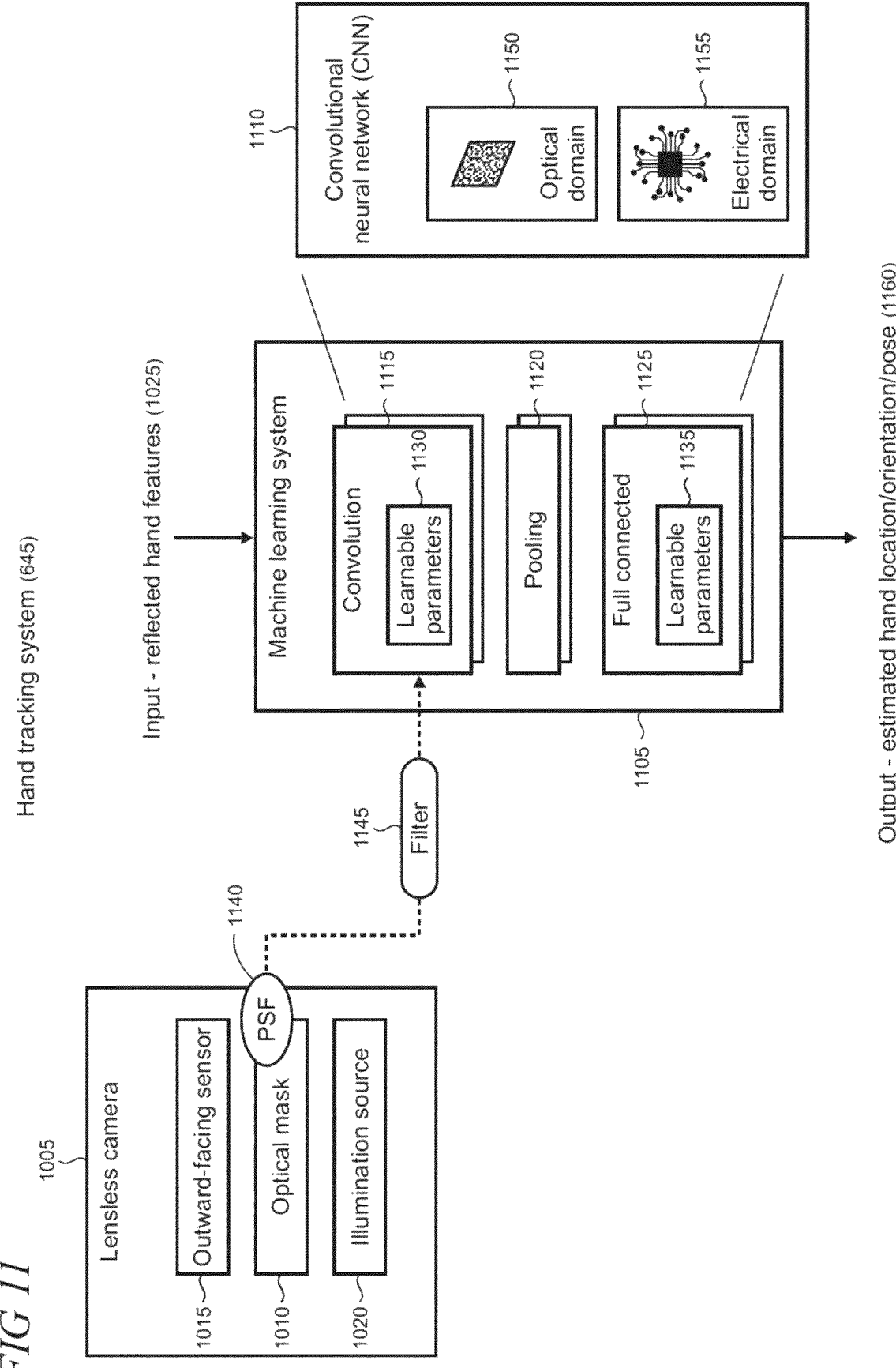
FIG. 11 shows an illustrative hand tracking system arranged in accordance with the present principles.

FIG. 11 shows an illustrative hand tracking system 645 arranged in accordance with the present principles comprising a lensless camera 1005 and a machine learning system

1105. In this illustrative example, the machine learning system comprises a convolutional neural network (CNN) 1110 including layers comprising instances of a convolution layer 1115, pooling layer 1120, and fully connected layer 1125. The convolution layer 1115 and fully connected layer 1125 include respective learnable parameters 1130 and 1135 that comprise weight matrices in the layers.

In accordance with the present principles, the point spread function (PSF) 1140 of the optical mask 1010 is used as a filter 1145 (which may comprise a collection of PSF kernels) in a first convolution layer 1115 of the CNN 1110 in the machine learning system 1105 which includes both optical and electrical domains 1150 and 1155. The filter 1145 is convolved with the input representing the reflected hand features 1025 in the optical domain to generate the coded hand feature map which is passed as an input to the remaining layers of the CNN in the electrical domain. Mathematically, the learnable parameters of the first convolution layer correspond to the PSF of the optical mask. In optical terms, the parameters comprise the transmittance pattern of the optical mask.

The machine learning system 1105 extracts hand features from the reflected hand features as encoded by the optical mask 1010 into the coded hand feature map. The machine learning system uses the extracted features to provide an output 1160 including, for example estimated hand location, orientation, pose, and the like.

Figure 12:
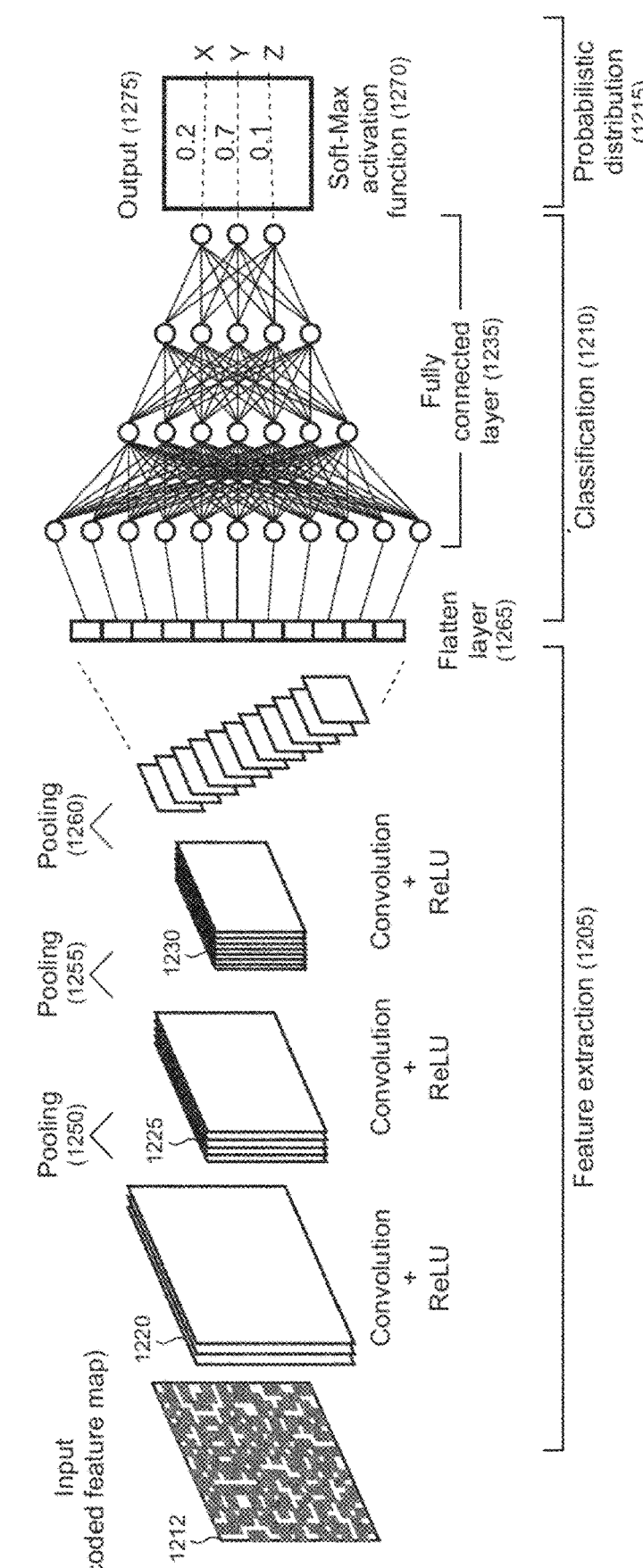
FIG. 12 shows an illustrative electrical domain portion of a convolutional neural network (CNN) arranged in accordance with the present principles.

FIG. 12 shows an illustrative electrical domain portion 1200 of a CNN (e.g., CNNs 910 and 1110 in FIGS. 9 and 11) arranged in accordance with the present principles. It may be appreciated that the electrical domain portion of the CNN may be individually adapted for use with each of the eye tracking and hand tracking systems 640 and 645 described above. The electrical domain portion includes sections adapted for feature extraction 1205, classification 1210, and probabilistic determination 1215. A coded feature map 1212 (e.g., a coded eye feature map or coded hand feature map) provided as an output from a convolution layer in an optical domain of the CNN is utilized as an input to a convolution layer 1220.

In this illustrative example, three convolution layers 1220, 1225, and 1230 are utilized along with one fully connected layer 1235. However, it is emphasized that this particular arrangement is illustrative of the present principles and is not intended to be limiting. A convolution layer identifies and extracts features and patterns from an input and preserves the information in a matrix. A matrix representation of the input is multiplied element-wise with filters and summed up to produce a feature matrix (i.e., a dot product between a combination of vectors in the input) which is passed as an input to the next convolution layer. In this illustrative example, each convolution layer includes a ReLU (rectified linear unit) layer which computes a ReLU activation function after a convolution is performed that enables the CNN to account for non-linear relationships.

Pooling layers 1250, 1255, and 1260 are periodically located between successive convolution layers. A pooling layer operates on each feature matrix independently to reduce its spatial resolution (e.g., height, width, and depth in some cases) while retaining features of the matrix required for classification. Pooling can typically include max-pooling and average pooling. Pooling progressively reduces the spatial size of a matrix to reduce the number of parameters and computation in the CNN network and may also control overfitting in which the neural network model fits exactly against its training data which can result in failure to generalize patterns and features in unseen data.

There can be multiple instances of convolution, ReLU and pooling layers in a given CNN. Initial layers of convolution learn generic information and downstream layers learn more specific/complex features. After the final convolution, ReLU, and pooling layers, an output feature matrix is converted into a vector (i.e., a one-dimensional array) in a flatten layer 1265. The output from the flatten layer is fed to the fully connected layer 1235.

The fully connected layer 1235 forms the last layers of the electrical domain portion of the CNN and appears like a regular neural network having full connections to all activations in the previous layer. Activations can therefore be computed with a matrix multiplication followed by a bias offset. A feature vector from the fully connected layer is further used by a Soft-Max activation function 1270 to classify a given input into distinct classes as an output 1275. The Soft-Max activation function maps the non-normalized output of a network to a probability distribution. In this example, the Soft-Max activation function assigns decimal probabilities to each class in which the probabilities sum equals 1.0. Such assignment enables the output (e.g., eye or hand position/location) to be interpreted directly as a probability or estimate. For example, in a hand tracking example, the probability that the coded feature map 1212 shows the user's hand in a pose "Y" is 70 percent.

Figure 13:
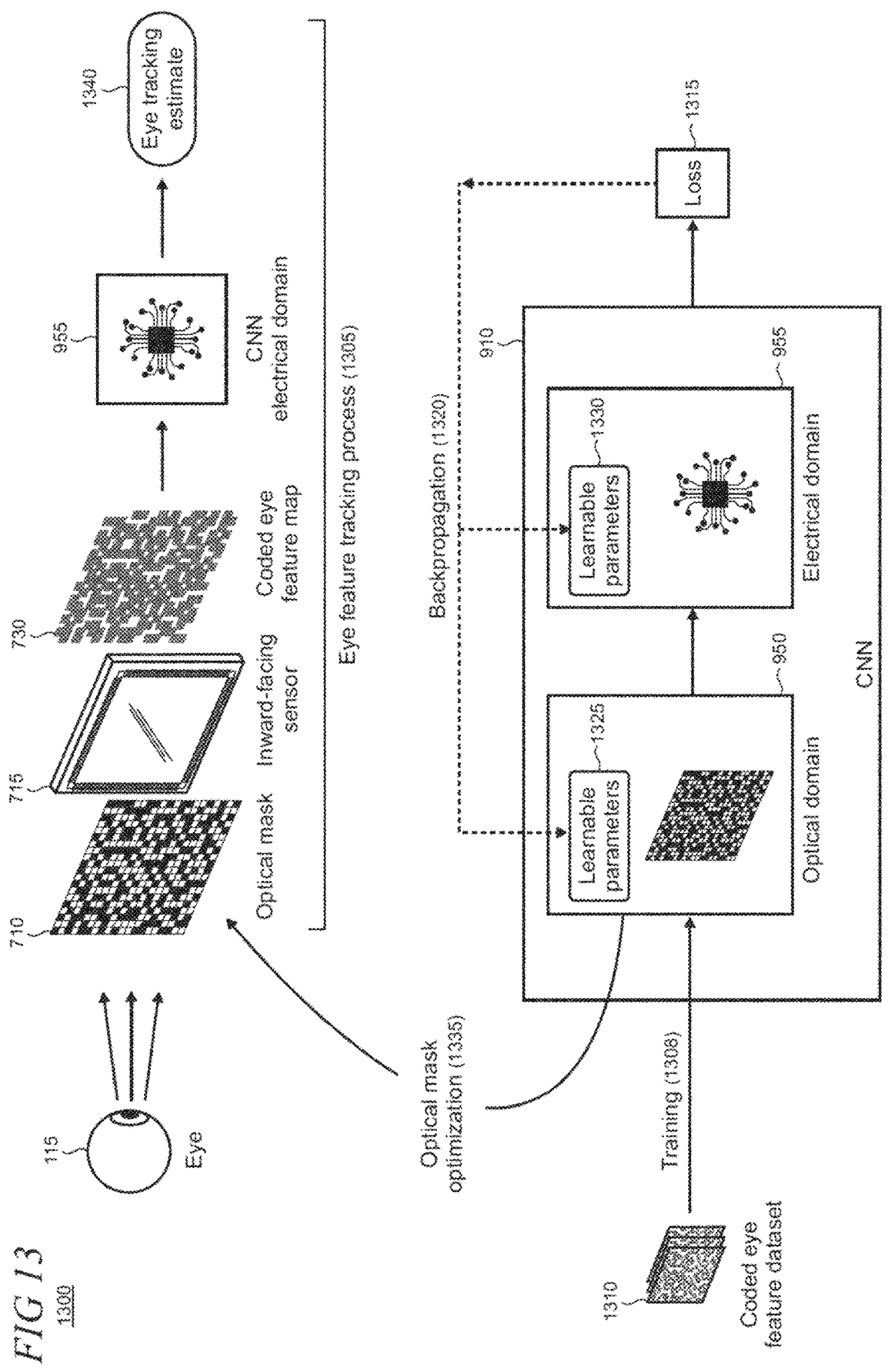
FIG. 13 shows an illustrative arrangement for jointly optimizing CNN components in the optical and electrical domains.

FIG. 13 shows an illustrative arrangement 1300 for jointly optimizing CNN components in the optical and electrical domains. While eye tracking is used in this example of joint optimization, it may be appreciated that the principles described herein may be adapted for hand tracking and other applications. The arrangement includes a CNN 910 and an eye feature tracking model 1305. The CNN includes an optical domain 950 in which an optical convolution model is implemented using the optical mask 710 and an electrical domain 955 that completes the eye feature extraction and gaze direction estimate processes.

During training (as indicated by reference numeral 1308) using a coded eye feature dataset 1310, a loss function 1315 is used to measure performance of the CNN 910 in classifying extracted eye features. The training dataset may include coded depth cues in optional implementations. Backpropagation 1320 is utilized to adjust respective learnable parameters 1325 and 1330 in the optical and electrical domains 950 and 955 to minimize the loss function by calculating its gradient. The learnable parameters include the convolution filter (i.e., the PSF of the optical mask 710) in the optical domain and the layer weights in the electrical domain.

Backpropagation relies on the chain rule of calculus to calculate the gradient backward through the layers of a neural network. Using gradient descent, the iterative adjustments to the learnable parameters enable movement closer to the minimum loss function value by taking small steps in the direction given by the gradient.

The results of joint optimization of the CNN components enable optical mask optimization (as indicated by reference numeral 1335) to be implemented in the optical domain. For example, the transmittance pattern of the optical mask 710 can be revised to implement a PSF that is tuned using the adjustments to the learnable parameters from backpropagation during training. The revised optical mask and adjusted weights in the CNN layers, when used in the eye tracking process, may be expected to provide an eye tracking estimate 1340 with increased accuracy compared to a non-optimized process.

FIG. 14 is a flowchart 1400 of an illustrative method for jointly optimizing a coded aperture in a lensless camera and a machine learning system in which the lensless camera and machine learning system are deployed in an HMD device wearable by a user. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized. It may appreciated that while the illustrative method is described with reference to eye tracking, similar joint optimization may also be adapted to hand tracking scenarios.

Step 1405 includes instantiating the coded aperture in a convolution layer of the machine learning system in which a transmittance pattern of the coded aperture is convolved with an image of an eye of the user. Step 1410 includes recording an output from the convolution layer on a sensor in the lensless camera as a coded eye feature map.

Step 1415 includes providing the coded eye feature map to downstream layers in the machine learning system for estimating the gaze direction of the user using eye features extracted from the coded eye feature map. Step 1420 includes performing backpropagation through the machine learning system to adjust parameters in the layers to minimize a loss function responsively to machine learning system training using a coded eye feature dataset.

Figures 15, 16, 17:
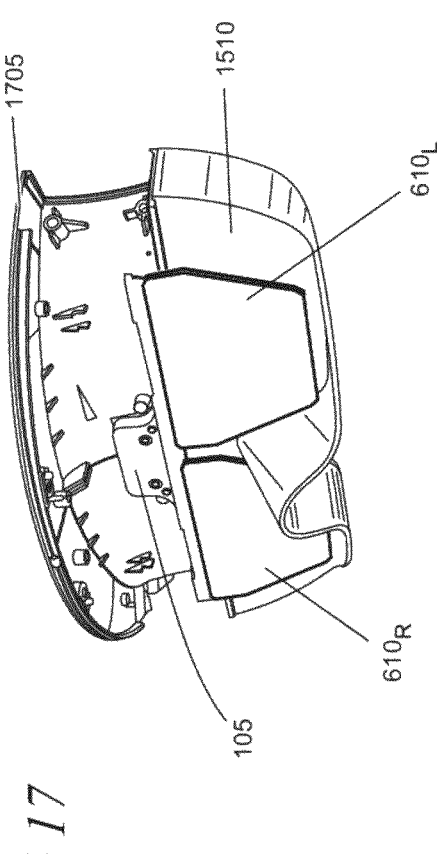
FIG. 15 shows a pictorial front view of an illustrative sealed visor that may be used as a component of an HMD device.
FIG. 16 shows a pictorial rear view of an illustrative sealed visor.
FIG. 17 shows a partially disassembled view of an illustrative sealed visor.

FIGS. 15 and 16 show respective front and rear views of an illustrative example of a visor 1500 that incorporates an internal near-eye display device 105 (FIGS. 1 and 2) that is used in the HMD device 100 as worn by a user 115. The visor, in some implementations, may be sealed to protect the internal display device. The visor typically interfaces with other components of the HMD device such as head-mounting/retention systems and other subsystems including sensors, power management, controllers, etc., as illustratively described in conjunction with FIGS. 20 and 21. Suitable interface elements (not shown) including snaps, bosses, screws and other fasteners, etc. may also be incorporated into the visor.

The visor 1500 may include see-through front and rear shields, 1505 and 1510 respectively, that can be molded using transparent or partially transparent materials to facilitate unobstructed vision to the display device and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 1705 shown in the disassembled view in FIG. 17.

The sealed visor 1500 can physically protect sensitive internal components, including a display device 105, when the HMD device is operated and during normal handling for cleaning and the like. The display device in this illustrative example includes left and right waveguide combiners $610_L$ and $610_R$ that respectively provide virtual images to the user's left and right eyes for mixed- and/or virtual-reality applications. The visor can also protect the display device from environmental elements and damage should the HMD device be dropped or bumped, impacted, etc.

As shown in FIG. 16, the rear shield 1510 is configured in an ergonomically suitable form 1605 to interface with the user's nose, and nose pads and/or other comfort features can be included (e.g., molded-in and/or added-on as discrete components). In some applications, the sealed visor 1500 can also incorporate some level of optical diopter curvature (i.e., eye prescription) within the molded shields in some cases.

Figure 18:
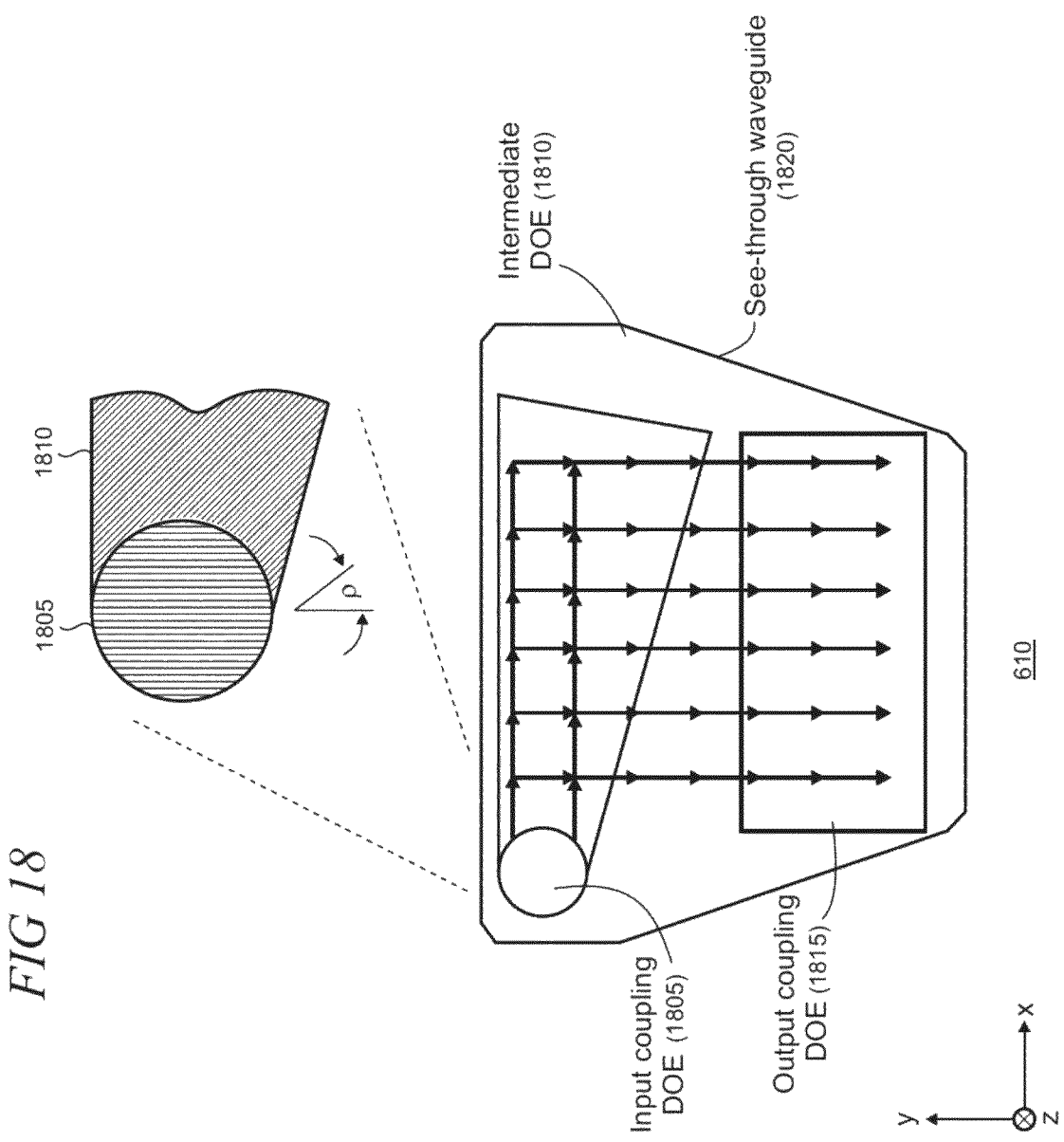
FIG. 18 shows an illustrative arrangement of diffractive optical elements (DOEs) configured for in-coupling, exit pupil expansion in two directions, and out-coupling.

FIG. 18 shows an illustrative waveguide combiner 610 having multiple diffractive optical elements (DOEs) that may be used in an embodiment of the display device 105 (FIG. 1) to provide input coupling, expansion of the exit pupil in two directions, and output coupling of virtual images from the display engine 605 (FIG. 6) to the user's eye. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating. DOEs may comprise, for example, surface relief grating (SRG) structures and volumetric holographic grating (VHG) structures.

The waveguide combiner 610 includes input and output couplers, which may comprise an input coupling DOE 1805 and an output coupling DOE 1815. An intermediate DOE 1810 may be provided that couples light between the input coupling and output coupling DOEs. The input coupling DOE is configured to couple image light comprising one or more imaging beams from the display engine into the waveguide 1820. The intermediate DOE expands the exit pupil in a first direction along a first coordinate axis (e.g., horizontal), and the output coupling DOE expands the exit pupil in a second direction along a second coordinate axis (e.g., vertical) and couples light out of the waveguide to the user's eye (i.e., outwards from the plane of the drawing page). The angle ρ is a rotation angle between the periodic lines of the input coupling DOE and the intermediate DOE as shown. As the light propagates in the intermediate DOE (horizontally from left to right in the drawing), it is also diffracted (in the downward direction) to the output coupling DOE.

While DOEs are shown in this illustrative example using a single input coupling DOE disposed to the left of the intermediate DOE 1810, which is located above the output coupling DOE, in some implementations, the input coupling DOE may be centrally positioned within the waveguide and one or more intermediate DOEs can be disposed laterally from the input coupling DOE to enable light to propagate to the left and right while providing for exit pupil expansion along the first direction. It may be appreciated that other numbers and arrangements of DOEs may be utilized to meet the needs of a particular implementation. In other implementations, optical components operating in reflection may be utilized for one or more of input coupler, intermediate coupler, or output coupler.

Figure 19:
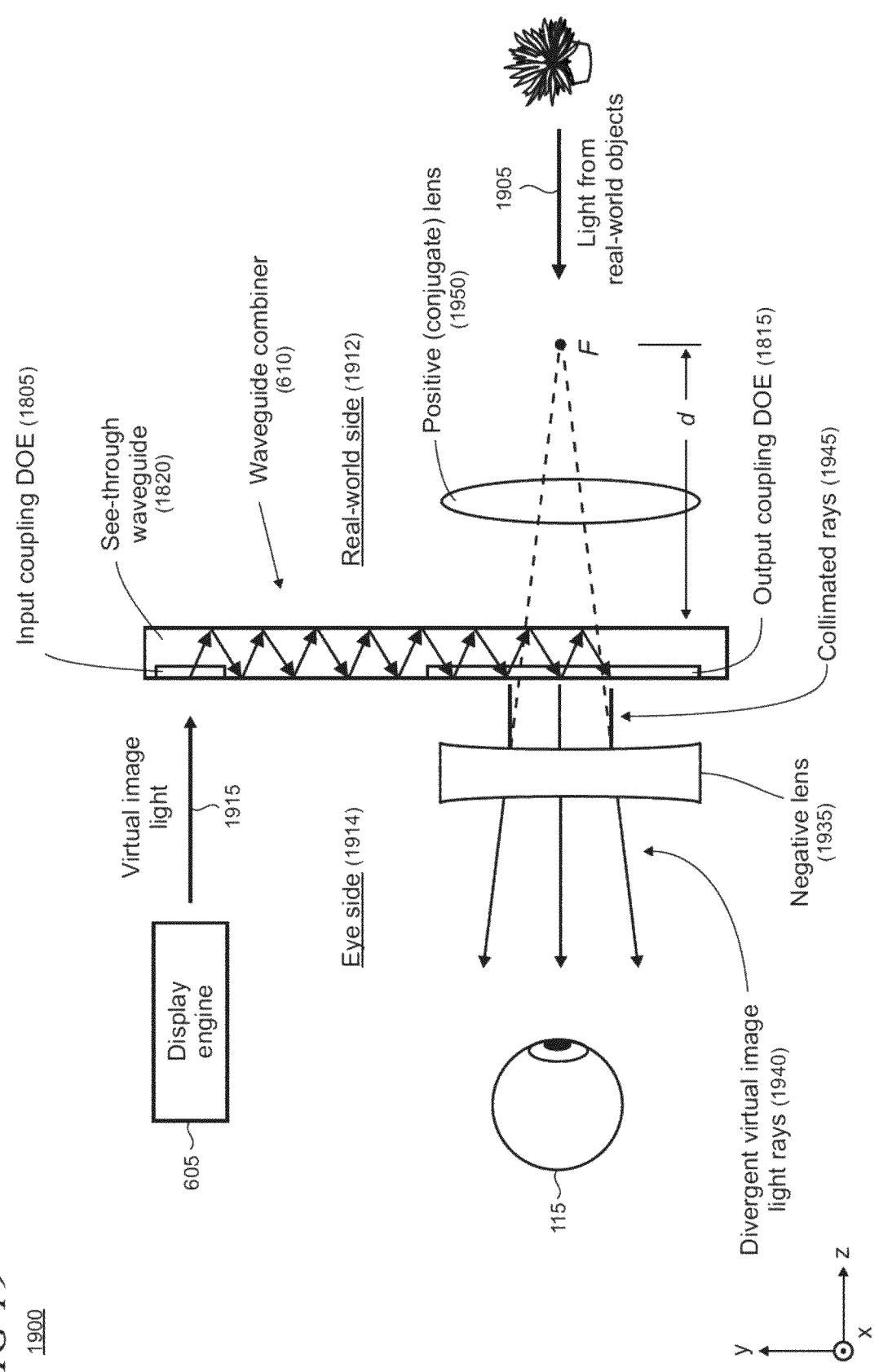
FIG. 19 shows a simplified side view of an illustrative virtual display system that includes a waveguide-based optical combiner that may be used in an HMD device.

FIG. 19 shows a simplified side view of an illustrative virtual display system 1900 that is incorporated into the display device 105 (FIG. 1) and which may be used in the HMD device 100 to render virtual images. The virtual display system may function as an optical combiner by superimposing the rendered virtual images over the user's view of light from real-world objects 1905 to thus form the mixed-reality display.

The display system includes at least one partially transparent (i.e., see-through) waveguide 1820 that is configured to propagate visible light. While a single waveguide is shown in FIG. 19 for sake of clarity in exposition of the present principles, it will be appreciated that a plurality of waveguides may be utilized in some applications. For example, three waveguides may be utilized in which a single waveguide supports each color component in an RGB (red, green, blue) color space.

The waveguide 1820 facilitates light transmission between the virtual image source and the eye. One or more waveguides can be utilized in the near-eye display system because they are transparent and because they are generally small and lightweight. This is desirable in applications such as HMD devices where size and weight are generally sought to be minimized for reasons of performance and user comfort. Use of the waveguide 1820 can enable the virtual image source to be located out of the way, for example, on the side of the user's head or near the forehead, leaving only a relatively small, light, and transparent waveguide optical element in front of the eyes.

The user 115 can look through the waveguide 1820 to see real-world objects on the real-world side of the display device 105 (the real-world side is indicated by reference numeral 1912 in FIG. 19). For the virtual part of the FOV of the display system, virtual image light 1915 is provided by the display engine 605. The virtual image light is in-coupled to the waveguide by an input coupling DOE 1805 and propagated through the waveguide in total internal reflection. The image light is out-coupled from the waveguide by an output coupling DOE 1815. The combination of the see-through waveguide and coupling elements may be referred to as a mixed-reality optical combiner because it functions to combine real-world and virtual-world images into a single display.

Typically, in such waveguide-based optical combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread. The collimated inputs and outputs in conventional waveguide-based display systems provide virtual images displayed by the display device that are focused at infinity.

In alternative embodiments, the optical combiner functionality provided by the waveguide and DOEs may be implemented using a reflective waveguide combiner. For example, partially reflective surfaces may be embedded in a waveguide and/or stacked in a geometric array to implement an optical combiner that uses partial field propagation. The reflectors can be half-tone, dielectric, holographic, polarized thin layer, or be fractured into a Fresnel element. In other alternative embodiments, the optical combiner functionality may be implemented using a reflective waveguide combiner having wavelength-sensitive reflective coatings with any suitable in-coupling and/or out-coupling methods. A reflective waveguide combiner may utilize a single waveguide in some implementations for all colors in the virtual images which may be desirable in some applications. By comparison, diffractive combiners typically require multiple waveguides to meet a target FOV in polychromatic applications due to limitations on angular range that are dictated by the waveguide TIR condition. In other alternative embodiments, various other waveguide/coupling configurations beyond reflective and diffractive may be utilized. For example, it may be appreciated that waveguides that are refractive, polarized, hybrid diffractive/refractive, phase multiplexed holographic, and/or achromatic metasurfaces may be utilized in some implementations.

A negative lens 1935 is located on the eye side of the waveguide 1820 (the eye side is indicated by reference numeral 1914 in FIG. 19). The negative lens acts over the entire extent of the eyebox associated with the user's eye to thereby create the diverging rays 1940 from the collimated rays 1945 that exit the output coupling DOE 1815. When the display engine 605 is operated to project virtual images that are in-coupled into the waveguide 1820, the output diverging rays present the virtual images at a predetermined focal depth, d, from the display system at an apparent or virtual point of focus, F. For example, if the negative lens is configured with −0.5 diopters of optical power, then d is equal to 2 m.

To ensure that the user's view of the real world remains unperturbed by the negative lens, a conjugate positive (i.e., convex) lens 1950 is located on the real-world side of the waveguide 1820 to compensate for the impact of the negative lens on the eye side. The conjugate pair of positive and negative lenses may be referred to as a push-pull lens pair in some contexts. In some applications, the functionality of the negative lens may be provided by a discrete standalone optical element. In other applications, one or more of the elements in the display device may be configured to incorporate the negative lens as an additional functionality. For example, the negative lens functionality can be integrated into the output coupler and/or waveguide in the display device using any suitable technique.

Different amounts of optical power may be utilized to provide for focal planes that are located at other distances to suit requirements of a particular application. The power of the negative lens 1935 does not affect the zeroth diffraction order that travels in TIR down the waveguide 1820 (i.e., from top to bottom in the drawings), but instead only affects the diffracted out-coupled field. In addition, the see-through field is not affected by the negative lens because whatever portion of the see-through field that is diffracted by the output coupling DOE 1815 is trapped by TIR in the waveguide and is therefore not transmitted to the user's eye.

Figure 20:
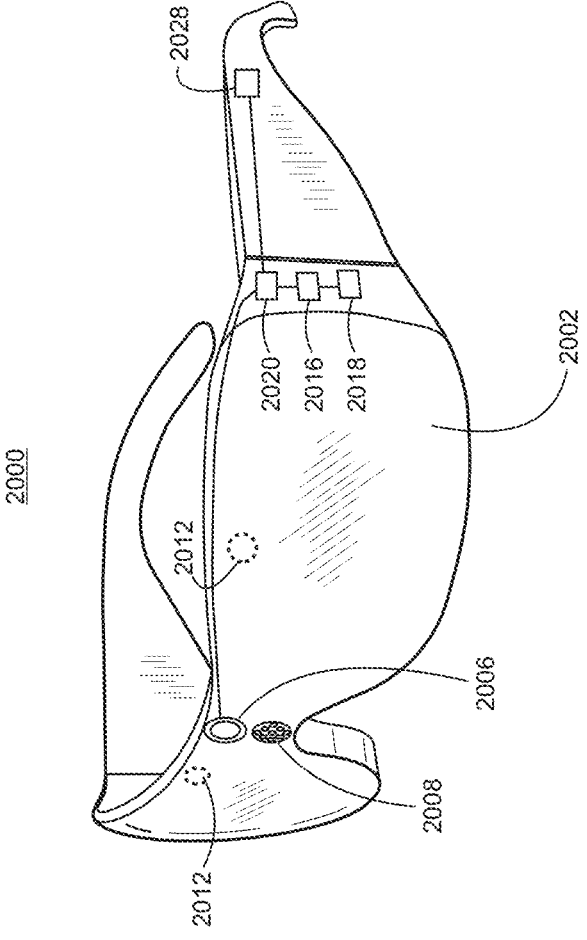
FIG. 20 is a pictorial view of an illustrative example of a virtual-reality or mixed-reality HMD device that may be configured for eye and/or hand tracking in accordance with the present principles.
Figure 21:
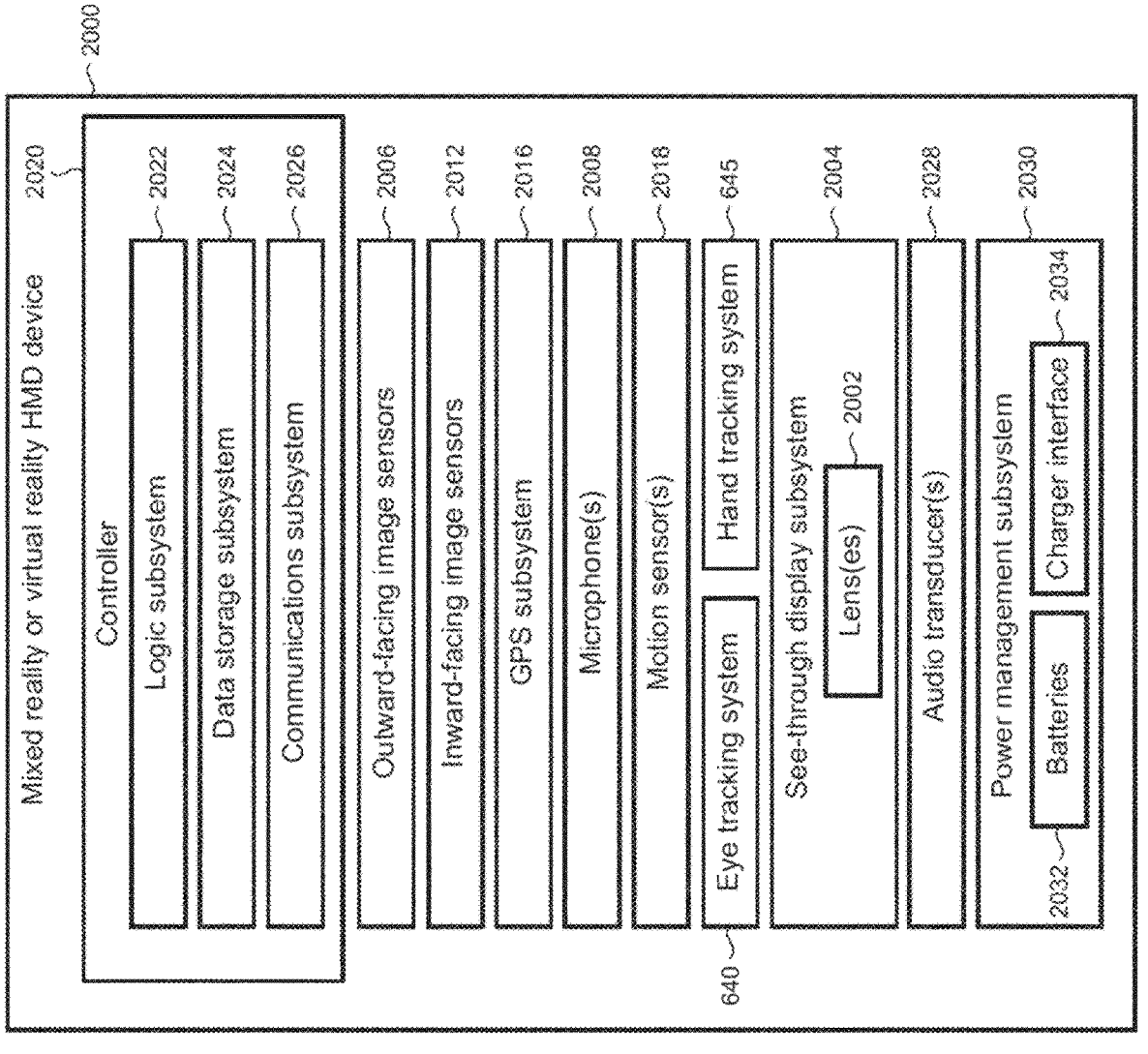
FIG. 21 shows a block diagram of an illustrative example of a virtual-reality or mixed-reality HMD device that may be configured for eye and/or hand tracking in accordance with the present principles.

As noted above, the present eye and hand tracking systems may be utilized in mixed- or virtual-reality applications. FIG. 20 shows one particular illustrative example of a mixed-reality HMD device 2000, and FIG. 21 shows a functional block diagram of the HMD device 2000. The HMD device 2000 provides an alternative form factor to the HMD device 100 shown in FIGS. 1-5 and 15-17. The HMD device comprises one or more lenses 2002 that form a part of a see-through display subsystem 2004, so that images may be displayed using lenses 2002 (e.g., using projection onto lenses 2002, one or more waveguide systems, such as a near-eye display system, incorporated into the lenses 2002, and/or in any other suitable manner).

The HMD device 2000 further comprises one or more outward-facing image sensors 2006 configured to acquire images of a background scene and/or physical environment being viewed by a user and may include one or more microphones 2008 configured to detect sounds, such as voice commands from a user. Outward-facing image sensors may include one or more depth sensors and/or one or more two-dimensional image sensors. The outward-facing image sensors may be included in a hand tracking system 645 (FIG. 6), as discussed above. In alternative arrangements, a mixed-reality or virtual-reality display system, instead of incorporating a see-through display subsystem, may display mixed-reality or virtual-reality images through a viewfinder mode for an outward-facing image sensor.

The HMD device 2000 may further include one or more inward-facing image sensors 2012 in an eye tracking system 640 (FIG. 6) configured for detecting a direction of gaze of each eye of a user or a direction or location of focus, as described above. The HMD device may also include additional sensors. For example, the HMD device may comprise a global positioning system (GPS) subsystem 2016 to allow a location of the HMD device to be determined. This may help to identify real-world objects, such as buildings, etc., that may be located in the user's adjoining physical environment.

The HMD device 2000 may further include one or more motion sensors 2018 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 2006. The use of motion data may allow changes in gaze direction to be tracked even if image data from outward-facing image sensor(s) 2006 cannot be resolved.

In addition, motion sensors 2018, as well as microphone(s) 2008 and eye tracking system 640, also may be employed as user input devices, such that a user may interact with the HMD device 2000 via gestures of the eye, neck and/or head, as well as via verbal commands in some cases. It may be understood that sensors illustrated in FIGS. 20 and 21 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2000 can further include a controller 2020 such as one or more processors having a logic subsystem 2022 and a data storage subsystem 2024 in communication with the sensors, eye tracking system 640, hand tracking system 645, display subsystem 2004, and/or other components through a communications subsystem 2026. The communications subsystem 2026 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2024 may include instructions stored thereon that are executable by logic subsystem 2022, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2000 is configured with one or more audio transducers 2028 (e.g., speakers, earphones, etc.) so that audio can be utilized as part of a mixed-reality or virtual-reality experience. A power management subsystem 2030 may include one or more batteries 2032 and/or protection circuit modules (PCMs) and an associated charger interface 2034 and/or remote power interface for supplying power to components in the HMD device 2000.

It may be appreciated that the HMD device 2000 is described for the purpose of example, and thus is not meant to be limiting. It may be further understood that the display device may include additional and/or alternative sensors, cameras, microphones, input devices, output devices, etc.

than those shown without departing from the scope of the present arrangement. Additionally, the physical configuration of an HMD device and its various sensors and subcomponents may take a variety of different forms without departing from the scope of the present arrangement.

Figure 22:
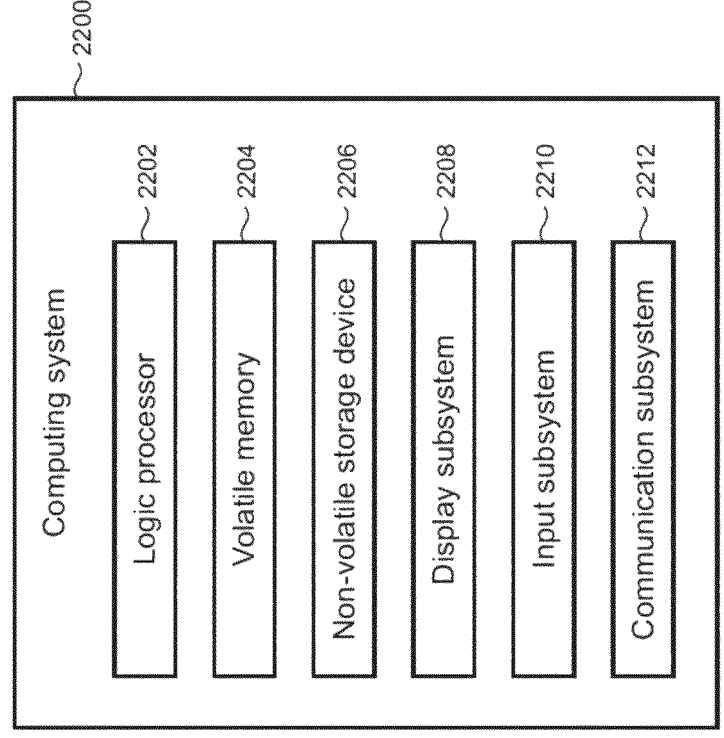
FIG. 22 schematically shows an illustrative example of a computing system that may be configured for eye and/or hand tracking in accordance with the present principles.

FIG. 22 schematically shows an illustrative example of a computing system that may be configured for eye and/or hand tracking in accordance with the present principles. Computing system 2200 is shown in simplified form. Computing system 2200 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 2200 includes a logic processor 2202, volatile memory 2204, and a non-volatile storage device 2206. Computing system 2200 may optionally include a display subsystem 2208, input subsystem 2210, communication subsystem 2212, and/or other components not shown in FIG. 22.

Logic processor 2202 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. In addition, or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 2206 includes one or more physical devices configured to hold instructions executable by the logic processors to implement the methods and processes described herein. When such methods and processes are implemented, the state of non-volatile storage device 2206 may be transformed—e.g., to hold different data.

Non-volatile storage device 2206 may include physical devices that are removable and/or built-in. Non-volatile storage device 2206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 2206 may include nonvolatile, dynamic, static, read/write, read-only, sequential-access, location-addressable, file-addressable, and/or content-addressable devices. It will be appreciated that non-volatile storage device 2206 is configured to hold instructions even when power is cut to the non-volatile storage device 2206.

Volatile memory 2204 may include physical devices that include random access memory. Volatile memory 2204 is typically utilized by logic processor 2202 to temporarily store information during processing of software instructions. It will be appreciated that volatile memory 2204 typically does not continue to store instructions when power is cut to the volatile memory 2204.

Aspects of logic processor 2202, volatile memory 2204, and non-volatile storage device 2206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 2200 typically implemented in software by a processor to perform a particular function using portions of volatile memory, which function involves transformative processing that specially configures the processor to perform the function. Thus, a program may be instantiated via logic processor 2202 executing instructions held by non-volatile storage device 2206, using portions of volatile memory 2204. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 2208 may be used to present a visual representation of data held by non-volatile storage device 2206. This visual representation may take the form of a graphical user interface (GUI). As the herein described methods and processes change the data held by the non-volatile storage device, and thus transform the state of the non-volatile storage device, the state of display subsystem 2208 may likewise be transformed to visually represent changes in the underlying data. Display subsystem 2208 may include one or more display devices utilizing virtually any type of technology; however, one utilizing a MEMS projector to direct laser light may be compatible with the eye-tracking system in a compact manner. Such display devices may be combined with logic processor 2202, volatile memory 2204, and/or non-volatile storage device 2206 in a shared enclosure, or such display devices may be peripheral display devices.

When included, input subsystem 2210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2212 may be configured to communicatively couple various computing devices described herein with each other, and with other devices. Communication subsystem 2212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2200 to send and/or receive messages to and/or from other devices via a network such as the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for jointly optimizing a coded aperture in a lensless camera and a machine learning system, the lensless camera deployed in a head-mounted display (HMD) device wearable by a user, the method comprising:

instantiating a coded aperture in a convolution layer of the machine learning system in which a transmittance pattern of the coded aperture is convolved with an image of an eye of the user;

recording an output from the convolution layer on a sensor in the lensless camera as a coded eye feature map;

providing the coded eye feature map to downstream layers in the machine learning system for estimating a gaze direction of the user using eye features extracted from the coded eye feature map; and performing backpropagation through the machine learning system to adjust parameters in the layers to minimize a loss function responsively to machine learning system training using a coded eye feature dataset.

2. The method of claim 1 in which the adjusted parameters comprise the transmittance pattern of the coded aperture and weights in the downstream layers.

3. The method of claim 1 in which eye features are extracted in the machine learning system while restricting deconvolution and reconstruction of the eye image.

4. The method of claim 1 in which the machine learning system comprises a convolutional neural network.

5. The method of claim 1 in which the transmittance pattern of the coded aperture is a weight distribution filter comprising a collection of point spread function (PSF) kernels.

6. The method of claim 5 further comprising tuning a PSF by adjusting parameters from the backpropagation.

7. The method of claim 6 further comprising applying gradient descent to adjust parameters from gradients calculated in the backpropagation.

8. The method of claim 1 further comprising instantiating a coded aperture in a convolution layer of the machine learning system in which a transmittance pattern of the coded aperture is convolved with an image of a body feature of the user and recording an output from the convolution layer on a sensor in the lensless camera as a coded body feature map, wherein the body feature comprises a hand.

9. The method of claim 8 further comprising providing the coded body feature map to downstream layers in the machine learning system for estimating a position of the hand of the user using body features extracted from the coded body feature map.

10. The method of claim 9 further comprising performing backpropagation through the machine learning system to adjust parameters in the layers to minimize a loss function responsively to machine learning system training using a coded body feature dataset.

11. A head-mounted display (HMD) device wearable by a user, comprising:

a processor; and memory storing computer-executable instructions that, when executed by the processor, cause the HMD device to utilize a machine learning system trained using a method comprising:

instantiating a coded aperture in a convolution layer of the machine learning system in which a transmittance pattern of the coded aperture is convolved with an image of an eye of the user;

recording an output from the convolution layer on a sensor in a lensless camera as a coded eye feature map;

providing the coded eye feature map to downstream layers in the machine learning system for estimating a gaze direction of the user using eye features extracted from the coded eye feature map; and performing backpropagation through the machine learning system to adjust parameters in the layers to minimize a loss function responsively to machine learning system training using a coded eye feature dataset.

12. The HMD device of claim 11 in which the adjusted parameters comprise the transmittance pattern of the coded aperture and weights in the downstream layers.

13. The HMD device of claim 11 in which eye features are extracted in the machine learning system while restricting deconvolution and reconstruction of the eye image.

14. The HMD device of claim 11 in which the machine learning system comprises a convolutional neural network.

15. The HMD device of claim 11 in which the transmittance pattern of the coded aperture is a weight distribution filter comprising a collection of point spread function (PSF) kernels.

16. The HMD device of claim 15 further comprising tuning a PSF by adjusting parameters from the backpropagation.

17. The HMD device of claim 16 further comprising applying gradient descent to adjust parameters from gradients calculated in the backpropagation.

18. The HMD device of claim 11 further comprising instantiating a coded aperture in a convolution layer of the machine learning system in which a transmittance pattern of the coded aperture is convolved with an image of a body feature of the user and recording an output from the convolution layer on a sensor in the lensless camera as a coded body feature map, wherein the body feature comprises a hand.

19. The HMD device of claim 18 further comprising providing the coded body feature map to downstream layers in the machine learning system for estimating a position of the hand of the user using body features extracted from the coded body feature map.

20. The HMD device of claim 19 further comprising performing backpropagation through the machine learning system to adjust parameters in the layers to minimize a loss function responsively to machine learning system training using a coded body feature dataset.

* * * * *